(12) United States Patent
Halliday et al.

(10) Patent No.: US 7,287,461 B2
(45) Date of Patent: *Oct. 30, 2007

(54) CARTRIDGE FOR THE PREPARATION OF BEVERAGES

(75) Inventors: Andrew Halliday, Hook Norton (GB); Steve Carter, London (GB)

(73) Assignee: Kraft Foods R & D, Inc., Munich (DE)

( * ) Notice: Subject to any disclaimer, the term of this patent is extended or adjusted under 35 U.S.C. 154(b) by 250 days.

This patent is subject to a terminal disclaimer.

(21) Appl. No.: 10/763,917

(22) Filed: Jan. 23, 2004

(65) Prior Publication Data

US 2004/0173102 A1     Sep. 9, 2004

Related U.S. Application Data

(60) Provisional application No. 60/462,538, filed on Apr. 11, 2003.

(30) Foreign Application Priority Data

Jan. 24, 2003   (GB)   ................................. 0301733.2

(51) Int. Cl.
  *B65D 85/00*  (2006.01)
  *A47J 31/10*  (2006.01)
(52) U.S. Cl. ........................... 99/295; 99/323; 426/77; 426/115
(58) Field of Classification Search ................. 99/295, 99/323, 302 R; 426/77, 82, 112, 115
  See application file for complete search history.

(56) References Cited

U.S. PATENT DOCUMENTS

| | | |
|---|---|---|
| 1,576,735 A | 3/1926 | Fessenden |
| 3,083,101 A | 3/1963 | Noury |
| 3,336,857 A * | 8/1967 | Knodt et al. .................. 99/296 |
| 3,403,617 A | 10/1968 | Lampe |
| 3,790,029 A | 2/1974 | Ward |
| D255,529 S | 6/1980 | Dziekonski |
| 4,382,402 A | 5/1983 | Alvarez |
| 4,471,689 A | 9/1984 | Piana |
| 4,484,515 A | 11/1984 | Illy |
| 4,551,611 A | 11/1985 | Longo |
| 4,653,390 A | 3/1987 | Hayes |
| 4,724,752 A | 2/1988 | Aliesch et al. |
| 4,738,378 A | 4/1988 | Oakley et al. |
| 4,744,291 A | 5/1988 | Wallin |
| 4,787,299 A | 11/1988 | Levi et al. |

(Continued)

FOREIGN PATENT DOCUMENTS

EP      0 057 671 A2     8/1982

(Continued)

*Primary Examiner*—Reginald L. Alexander
(74) *Attorney, Agent, or Firm*—Fitch, Even, Tabin & Flannery

(57) ABSTRACT

A cartridge containing one or more beverage ingredients and being formed from substantially air- and water-impermeable materials, the cartridge comprising an inlet for the introduction of an aqueous medium into the cartridge and an outlet for discharge of a beverage produced from the one or more beverage ingredients, wherein the cartridge comprises an outer member and an inner member conjoined on assembly with the outer member, characterized by the inner member comprising a discharge spout defining the outlet of the cartridge.

20 Claims, 13 Drawing Sheets

U.S. PATENT DOCUMENTS

| | | | |
|---|---|---|---|
| 4,806,375 A | 2/1989 | Favre | |
| 4,818,544 A | 4/1989 | Seward | |
| 4,838,152 A | 6/1989 | Kubicko et al. | |
| 4,846,052 A | 7/1989 | Favre et al. | |
| 4,853,234 A | 8/1989 | Bentley et al. | |
| 4,873,915 A | 10/1989 | Newman et al. | |
| 4,876,953 A | 10/1989 | Imamura et al. | |
| 4,886,674 A | 12/1989 | Seward et al. | |
| 4,917,005 A | 4/1990 | Knepler | |
| 4,920,870 A | 5/1990 | Newman et al. | |
| 4,921,712 A | 5/1990 | Malmquist | |
| 4,990,352 A | 2/1991 | Newman et al. | |
| 5,014,611 A | 5/1991 | Illy et al. | |
| 5,063,836 A | 11/1991 | Patel | |
| 5,072,660 A | 12/1991 | Helbling | |
| 5,082,676 A | 1/1992 | Love et al. | |
| 5,111,740 A * | 5/1992 | Klein | 99/295 |
| 5,134,924 A | 8/1992 | Vicker | |
| 5,178,058 A | 1/1993 | van Dort et al. | |
| 5,183,998 A | 2/1993 | Hoffman et al. | |
| 5,186,096 A | 2/1993 | Willi | |
| 5,197,374 A | 3/1993 | Fond | |
| 5,242,702 A | 9/1993 | Fond | |
| 5,259,295 A | 11/1993 | Timm | |
| 5,265,520 A | 11/1993 | Giuliano | |
| 5,272,960 A | 12/1993 | Kinna | |
| 5,285,717 A | 2/1994 | Knepler | |
| 5,287,797 A | 2/1994 | Grykiewicz et al. | |
| 5,303,639 A | 4/1994 | Bunn et al. | |
| 5,325,765 A | 7/1994 | Sylvan et al. | |
| 5,327,815 A | 7/1994 | Fond et al. | |
| 5,343,799 A | 9/1994 | Fond | |
| 5,347,916 A | 9/1994 | Fond et al. | |
| 5,349,897 A | 9/1994 | King et al. | |
| 5,375,508 A | 12/1994 | Knepler et al. | |
| 5,398,595 A | 3/1995 | Fond et al. | |
| 5,398,596 A | 3/1995 | Fond | |
| 5,408,917 A | 4/1995 | Lüssi | |
| 5,440,972 A | 8/1995 | English | |
| 5,455,887 A | 10/1995 | Dam | |
| 5,463,932 A | 11/1995 | Olson | |
| 5,472,719 A | 12/1995 | Favre | |
| 5,479,849 A | 1/1996 | King et al. | |
| 5,531,152 A | 7/1996 | Gardosi | |
| 5,531,604 A | 7/1996 | Huang | |
| 5,549,035 A | 8/1996 | Wing-Chung | |
| 5,603,254 A | 2/1997 | Fond et al. | |
| 5,637,335 A | 6/1997 | Fond et al. | |
| 5,638,740 A * | 6/1997 | Cai | 99/295 |
| 5,638,741 A | 6/1997 | Cisaria | |
| 5,639,023 A | 6/1997 | Hild et al. | |
| 5,649,412 A | 7/1997 | Binacchi | |
| 5,649,472 A | 7/1997 | Fond et al. | |
| 5,704,275 A | 1/1998 | Warne | |
| 5,738,001 A | 4/1998 | Liverani | |
| 5,762,987 A | 6/1998 | Fond et al. | |
| 5,776,527 A | 7/1998 | Blanc | |
| 5,794,519 A | 8/1998 | Fischer | |
| 5,826,492 A | 10/1998 | Fond et al. | |
| 5,840,189 A | 11/1998 | Sylvan et al. | |
| 5,858,437 A | 1/1999 | Anson | |
| 5,862,738 A | 1/1999 | Warne | |
| 5,895,672 A | 4/1999 | Cooper | |
| 5,897,899 A | 4/1999 | Fond | |
| 5,921,168 A | 7/1999 | Nello | |
| 5,948,455 A | 9/1999 | Schaeffer et al. | |
| 5,967,021 A | 10/1999 | Yung | |
| 5,974,950 A | 11/1999 | King | |
| 5,992,298 A | 11/1999 | Illy et al. | |
| 6,000,317 A | 12/1999 | Van Der Meer | |
| 6,006,653 A | 12/1999 | Sham et al. | |
| 6,009,792 A | 1/2000 | Kraan | |
| D419,821 S | 2/2000 | Powell et al. | |
| 6,021,705 A | 2/2000 | Dijs | |
| 6,025,000 A | 2/2000 | Fond et al. | |
| D423,863 S | 5/2000 | Lupi | |
| 6,062,127 A | 5/2000 | Klosinski et al. | |
| 6,068,871 A | 5/2000 | Fond et al. | |
| 6,082,245 A | 7/2000 | Nicolai | |
| 6,095,031 A | 8/2000 | Warne | |
| 6,109,168 A | 8/2000 | Illy et al. | |
| 6,117,471 A | 9/2000 | King | |
| 6,142,063 A | 11/2000 | Beaulieu et al. | |
| 6,170,386 B1 | 1/2001 | Paul | |
| 6,173,117 B1 | 1/2001 | Clubb | |
| 6,178,874 B1 | 1/2001 | Joergensen | |
| 6,182,554 B1 | 2/2001 | Beaulieu et al. | |
| 6,186,051 B1 | 2/2001 | Aarts | |
| D443,792 S | 6/2001 | Peters et al. | |
| 6,240,832 B1 | 6/2001 | Schmed et al. | |
| 6,240,833 B1 | 6/2001 | Sham et al. | |
| 6,245,371 B1 | 6/2001 | Gutwein et al. | |
| 6,279,459 B1 | 8/2001 | Mork et al. | |
| 6,289,948 B1 | 9/2001 | Jeannin et al. | |
| D452,107 S | 12/2001 | Cahen | |
| 6,347,725 B1 | 2/2002 | Yoakim et al. | |
| 6,358,545 B1 | 3/2002 | Chandler et al. | |
| 6,405,637 B1 | 6/2002 | Cai | |
| D459,628 S | 7/2002 | Cahen | |
| D460,653 S | 7/2002 | Cahen | |
| D461,358 S | 8/2002 | Cahen | |
| D475,567 S | 6/2003 | Hsu | |
| 6,606,938 B2 | 8/2003 | Taylor | |
| 6,607,762 B2 | 8/2003 | Lazaris et al. | |
| D479,939 S | 9/2003 | Au | |
| 6,612,224 B2 | 9/2003 | Mercier et al. | |
| 6,645,537 B2 | 11/2003 | Sweeney et al. | |
| 6,655,260 B2 | 12/2003 | Lazaris et al. | |
| D489,930 S | 5/2004 | Tse | |
| 6,786,136 B2 * | 9/2004 | Cirigliano et al. | 99/323 |
| 2001/0048957 A1 | 12/2001 | Lazaris et al. | |
| 2002/0002913 A1 | 1/2002 | Mariller et al. | |
| 2002/0015768 A1 | 2/2002 | Masek et al. | |
| 2002/0023543 A1 | 2/2002 | Schmed | |
| 2002/0048621 A1 | 4/2002 | Boyd et al. | |
| 2002/0078831 A1 | 6/2002 | Cai | |
| 2002/0088807 A1 | 7/2002 | Perkovic et al. | |
| 2002/0121197 A1 | 9/2002 | Mercier et al. | |
| 2002/0121198 A1 | 9/2002 | Kollep et al. | |
| 2002/0124736 A1 | 9/2002 | Kollep et al. | |
| 2002/0129712 A1 | 9/2002 | Westbrook et al. | |
| 2002/0144603 A1 | 10/2002 | Taylor | |
| 2002/0144604 A1 | 10/2002 | Winkler et al. | |
| 2002/0148356 A1 | 10/2002 | Lazaris et al. | |
| 2002/0148357 A1 | 10/2002 | Lazaris et al. | |
| 2003/0005826 A1 | 1/2003 | Sargent et al. | |
| 2003/0039731 A1 | 2/2003 | Dalton et al. | |
| 2003/0056655 A1 | 3/2003 | Kollep et al. | |
| 2003/0145736 A1 | 8/2003 | Green | |
| 2003/0222089 A1 | 12/2003 | Hale | |

FOREIGN PATENT DOCUMENTS

| | | |
|---|---|---|
| EP | 0 151 252 A1 | 8/1985 |
| EP | 0 272 922 A2 | 6/1988 |
| EP | 0 334 571 A1 | 9/1989 |
| EP | 0 334 572 A1 | 9/1989 |
| EP | 0 449 533 A1 | 10/1991 |
| EP | 0 451 980 A2 | 10/1991 |
| EP | 0 455 337 A1 | 11/1991 |
| EP | 0 469 162 A1 | 2/1992 |
| EP | 0 521 510 A1 | 1/1993 |
| EP | 0 524 464 A1 | 1/1993 |
| EP | 0 638 486 A1 | 2/1995 |

| | | | | | | |
|---|---|---|---|---|---|---|
| EP | 0 604 615 B1 | 9/1998 | | WO | WO-95/07648 A1 | 3/1995 |
| EP | 0 862 882 A1 | 9/1998 | | WO | WO-95/16377 A1 | 6/1995 |
| EP | 0 870 457 A1 | 10/1998 | | WO | WO-97/17006 A1 | 5/1997 |
| EP | 0 904 718 A1 | 3/1999 | | WO | WO-98/27854 A1 | 7/1998 |
| EP | 0 730 425 B1 | 5/1999 | | WO | WO-00/28868 A1 | 5/2000 |
| EP | 0 756 844 B1 | 5/1999 | | WO | WO-00/42891 A1 | 7/2000 |
| EP | 1 042 978 A1 | 10/2000 | | WO | WO-01/15582 A1 | 3/2001 |
| EP | 1 090 574 A1 | 4/2001 | | WO | WO-01/30218 A1 | 5/2001 |
| EP | 1 095 605 A1 | 5/2001 | | WO | WO-01/58786 A1 | 8/2001 |
| EP | 1 101 430 A1 | 5/2001 | | WO | WO-01/60219 A1 | 8/2001 |
| EP | 1 153 561 A1 | 11/2001 | | WO | WO-01/60220 A1 | 8/2001 |
| EP | 1 208 782 A1 | 5/2002 | | WO | WO-01/82760 A1 | 11/2001 |
| EP | 0 862 882 B1 | 7/2002 | | WO | WO-02/19875 A1 | 3/2002 |
| EP | 1 255 685 A1 | 11/2002 | | WO | WO-02/28241 A1 | 4/2002 |
| EP | 1 274 332 A1 | 1/2003 | | WO | WO-02/074143 A2 | 9/2002 |
| EP | 1 316 283 A2 | 6/2003 | | WO | WO-02/074661 A1 | 9/2002 |
| EP | 1 255 685 B1 | 4/2004 | | WO | WO-02/082962 A1 | 10/2002 |
| FR | 1 537 031 | 8/1968 | | WO | WO-02/085170 A2 | 10/2002 |
| FR | 2 322 796 A1 | 4/1977 | | WO | WO-02/087400 A1 | 11/2002 |
| GB | 468 248 A | 7/1937 | | WO | WO-02/092439 A2 | 11/2002 |
| GB | 828 529 A | 2/1960 | | WO | WO-02/085170 A3 | 3/2003 |
| GB | 1 215 840 A | 12/1970 | | WO | WO-03/026470 A2 | 4/2003 |
| GB | 2 306 432 A | 5/1997 | | WO | WO-03/039309 A1 | 5/2003 |
| GB | 2 374 795 A | 10/2002 | | WO | WO-03/059778 A2 | 7/2003 |
| GB | 2 374 816 A | 10/2002 | | WO | WO-03/065859 A2 | 8/2003 |
| GB | 2 374 856 A | 10/2002 | | WO | WO-03/065859 A3 | 12/2003 |
| GB | 2 379 624 A | 3/2003 | | WO | WO-03/059778 A3 | 1/2004 |
| JP | 2000-93309 | 4/2000 | | | | |
| WO | WO-88/07472 A1 | 10/1988 | | * cited by examiner | | |

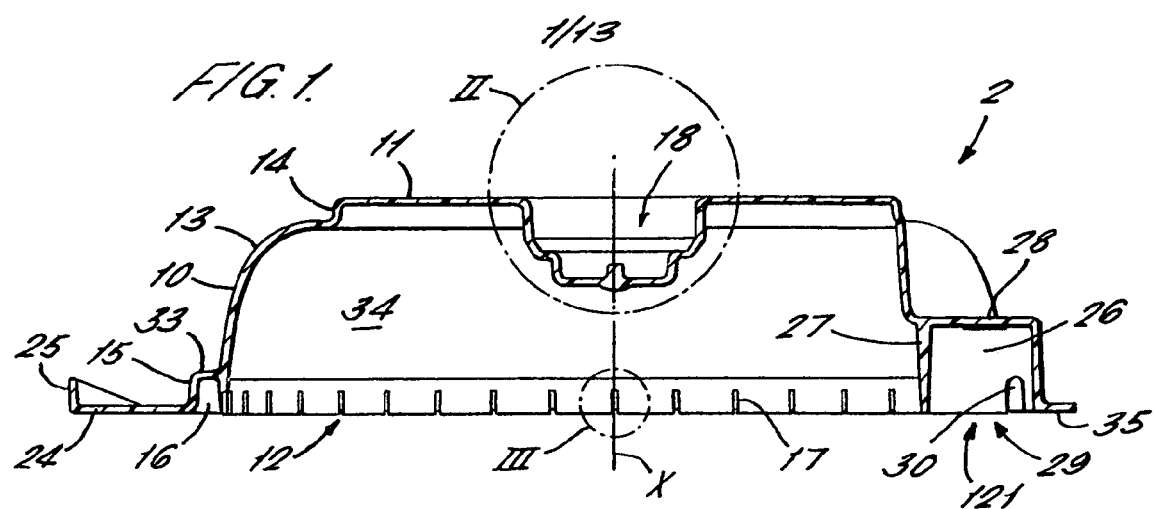
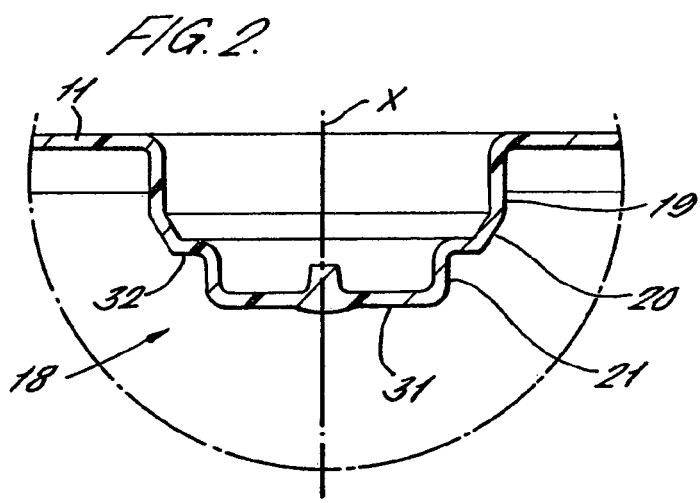
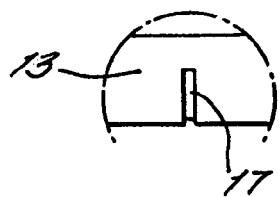

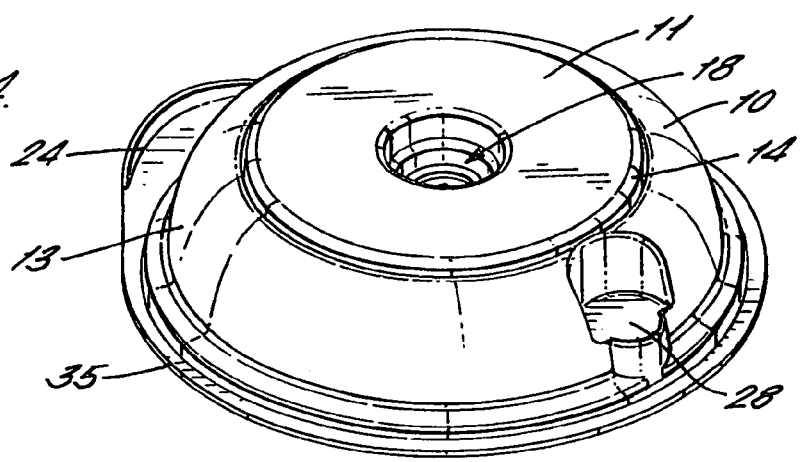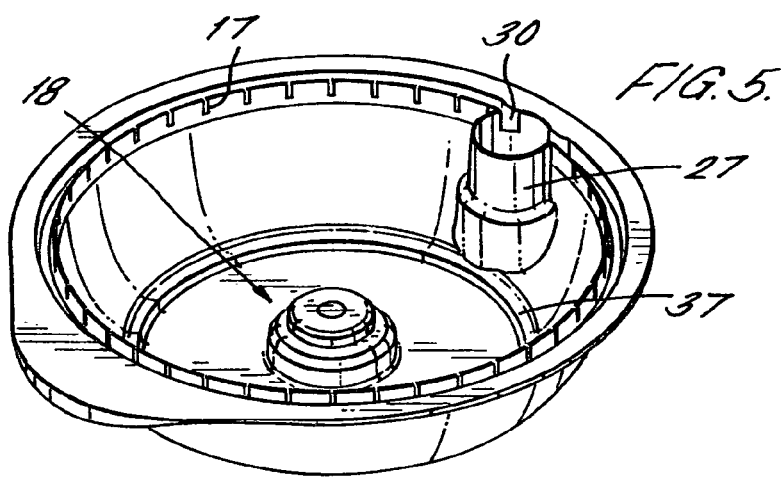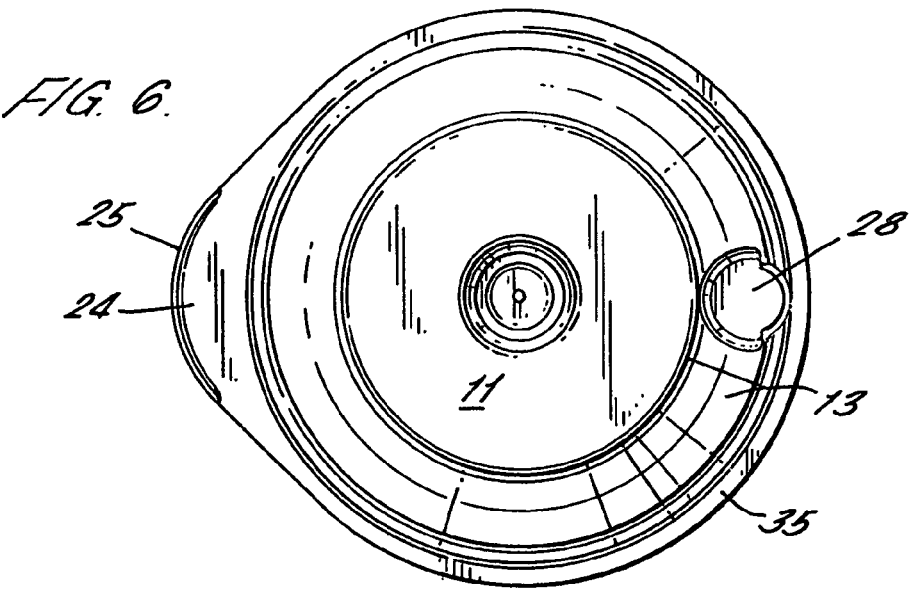

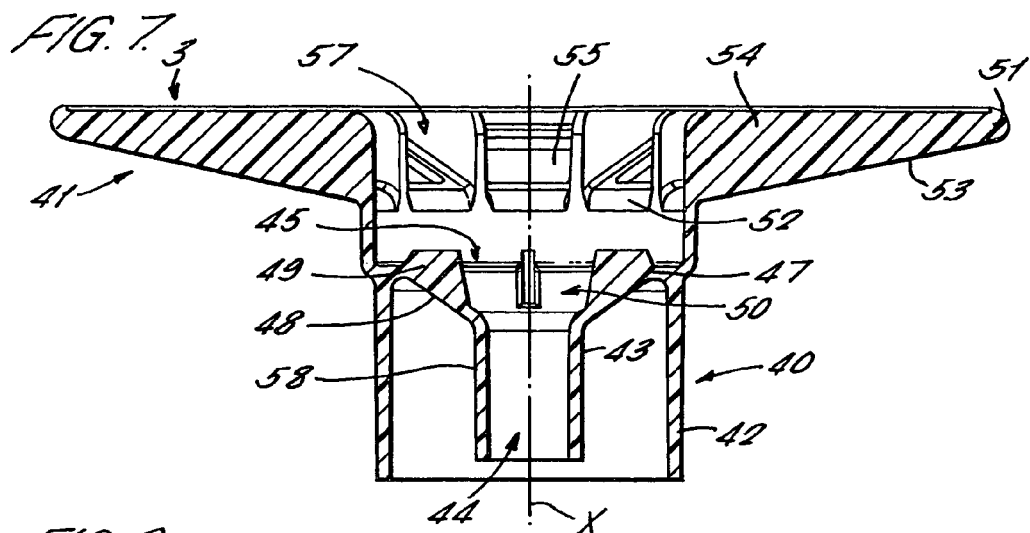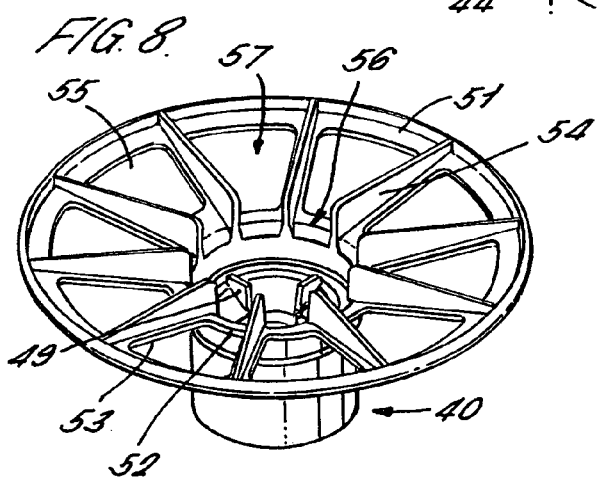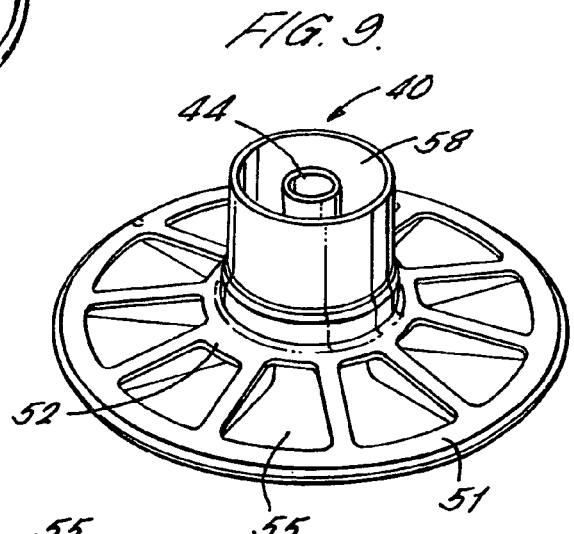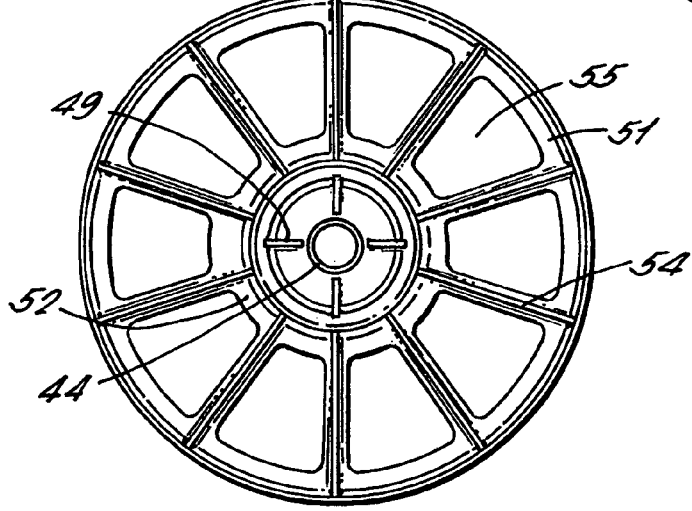

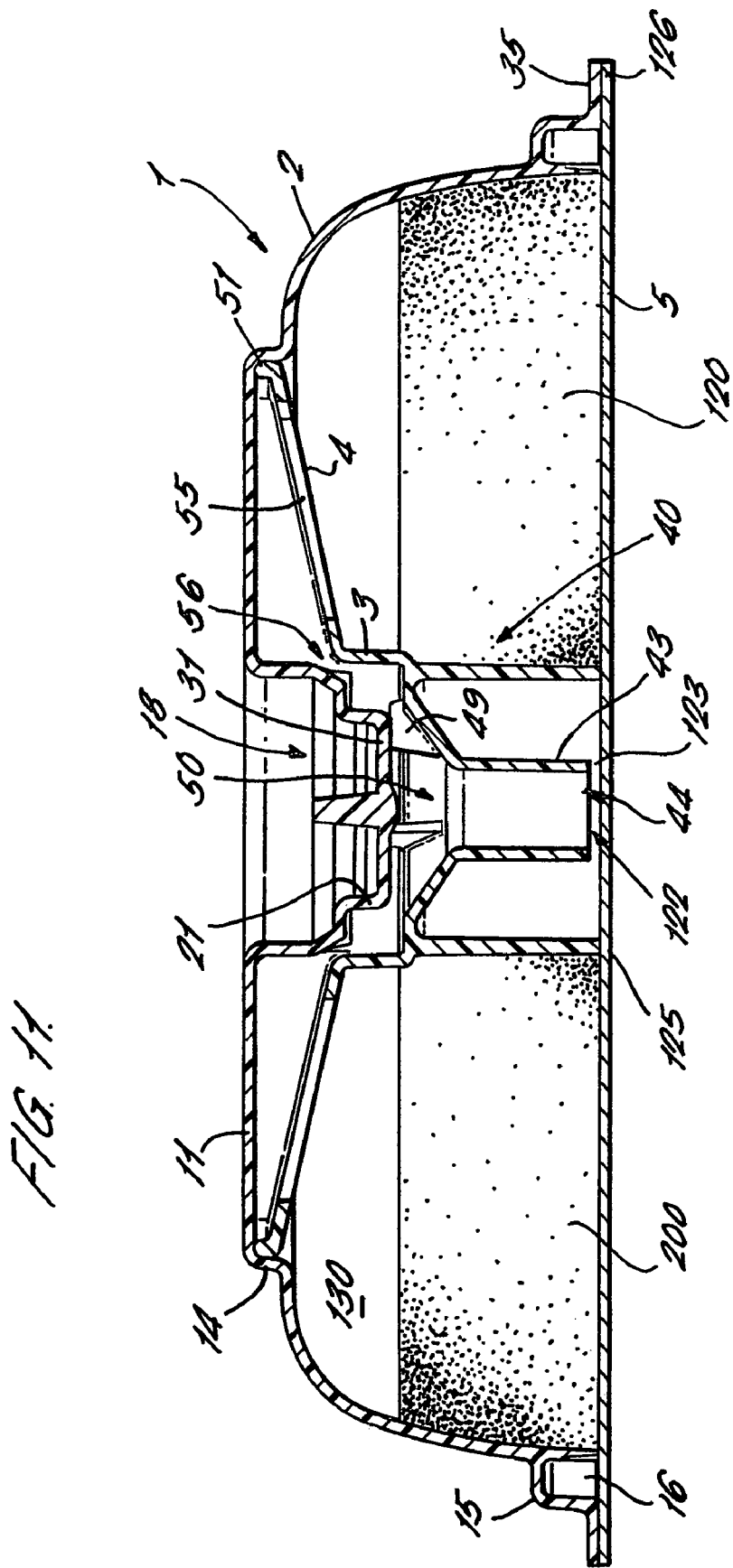

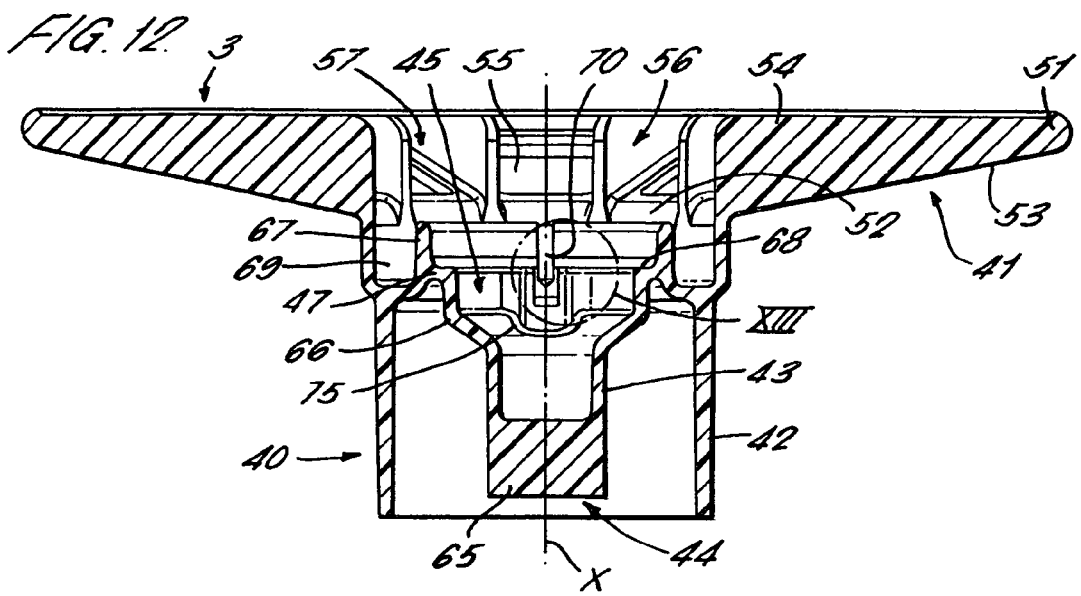
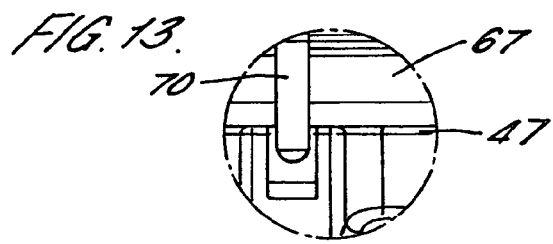
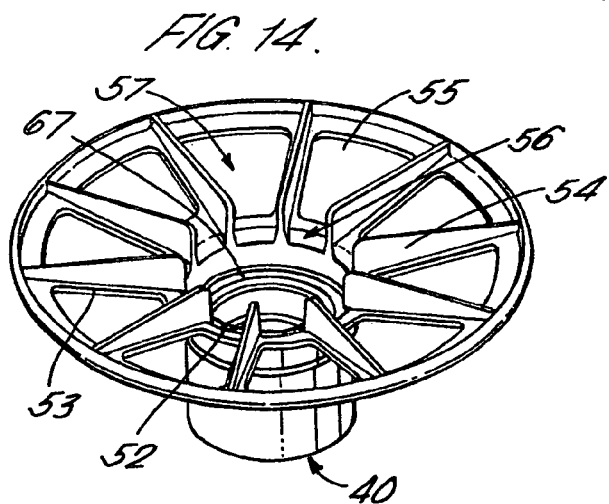
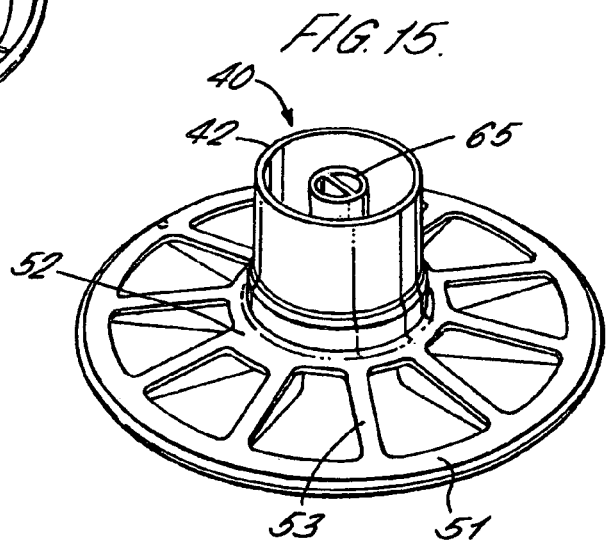

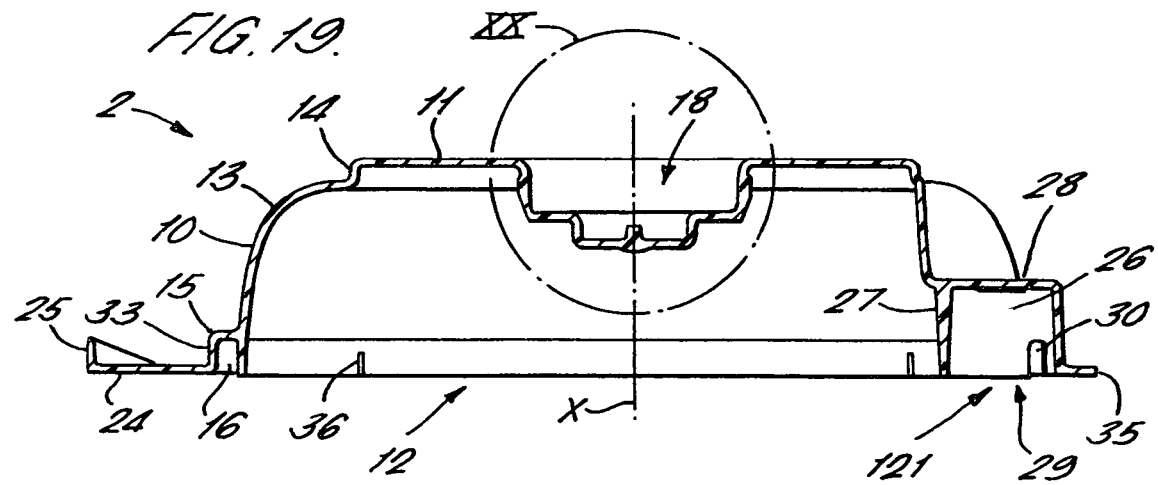
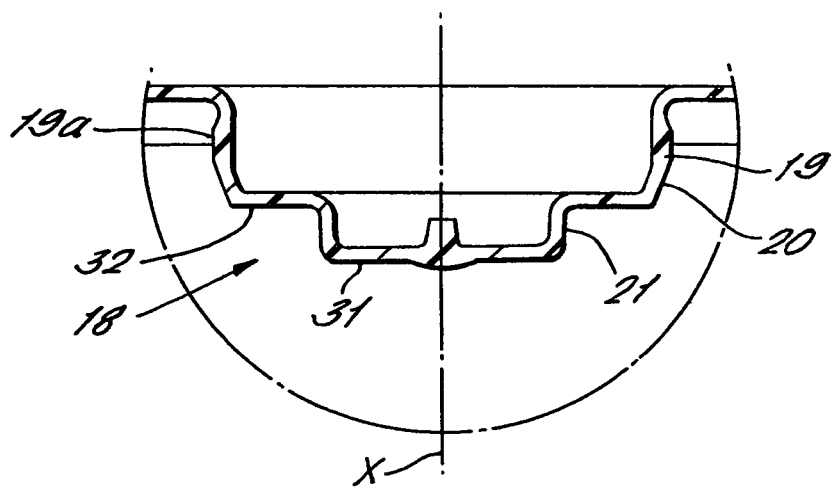

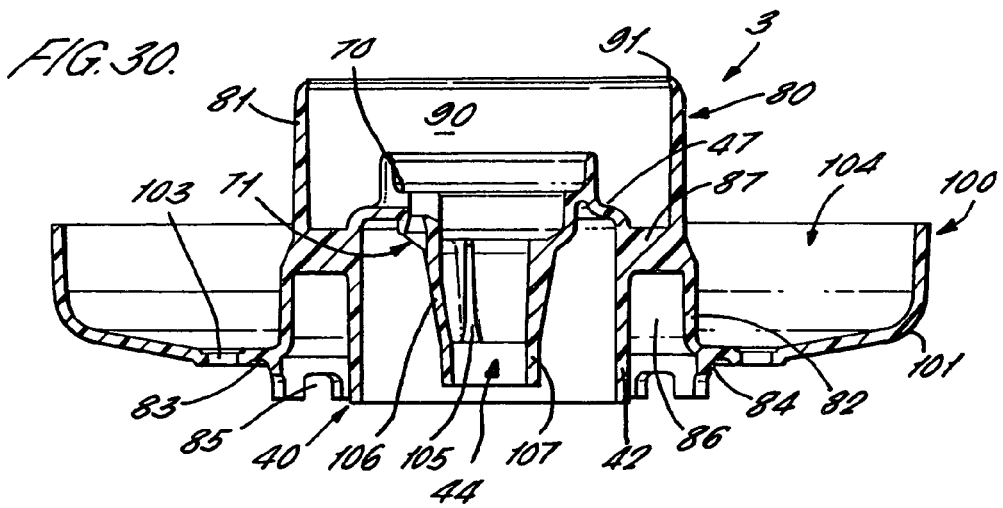
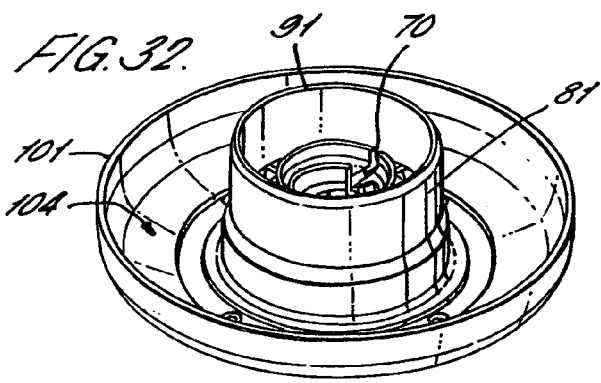
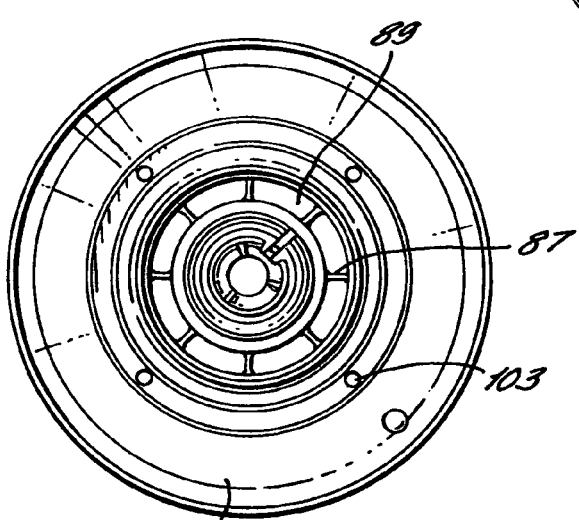
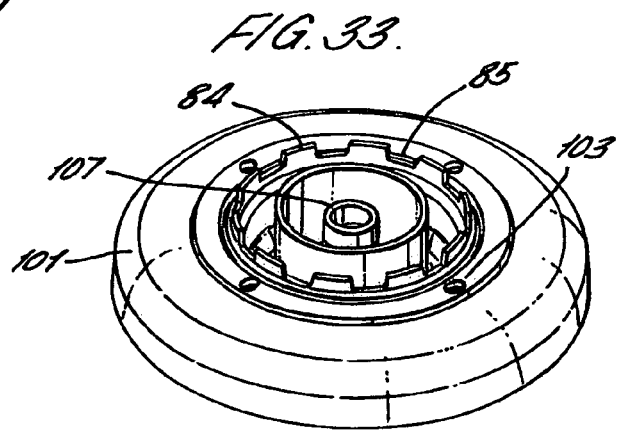

CARTRIDGE FOR THE PREPARATION OF BEVERAGES

RELATED APPLICATION

This application claims priority from U.S. provisional patent application No. 60/462,538, filed Apr. 11, 2003, which is hereby incorporated by reference.

BACKGROUND

The present invention relates to a cartridge for the preparation of beverages and, in particular, to sealed cartridges which are formed from substantially air- and water-impermeable materials and which contain one or more ingredients for the preparation of beverages.

It has previously been proposed to seal beverage preparation ingredients in individual air-impermeable packages. For example, cartridges or capsules containing compacted ground coffee are known for use in certain coffee preparation machines which are generally termed "espresso" machines. In the production of coffee using these preparation machines the coffee cartridge is placed in a brewing chamber and hot water is passed though the cartridge at relatively high pressures, thereby extracting the aromatic coffee constituents from the ground coffee to produce the coffee beverage. Typically, such machines operate at a pressure of greater than $6 \times 10^5$ Pa. The preparation machines of the type described have to date been relatively expensive since components of the machine, such as the water pumps and seals, must be able to withstand the high pressures.

In WO01/58786 there is described a cartridge for the preparation of beverages which operates at a pressure generally in the range 0.7 to $2.0 \times 10^5$ Pa. However, the cartridge is designed for use in a beverage preparation machine for the commercial or industrial market and is relatively expensive. Hence, there remains a requirement for a cartridge for the preparation of beverages wherein the cartridges and beverage preparation machine are suitable, in particular, for the domestic market in terms of cost, performance and reliability.

It has also proven difficult to sterilise beverage cartridges of the types described above due to the narrow and tortuous pathways which are formed in the cartridge bodies. Sterilisation, for example by exposure of the cartridges to steam vapour, may not be fully effective for tortuous pathways due to the surface tension properties of the cartridge which prevent ingress of the steam vapour into the tortuous pathways and hence prevent exposure of the entire component surfaces to the steam vapour.

Beverage cartridges can be prone to spluttering and splashing problems wherein during the dispensation of the beverage from the cartridge beverage is sprayed or splashed outside the confines of the receptacle. This is particularly the case with beverages dispensed at relatively high pressure. It has been attempted to alleviate this problem by providing a discharge probe on the beverage preparation machine which guides the beverage into the receptacle. However, the discharge probe tends to become contaminated over time with beverage residue and is difficult to clean. Further, there is a risk of cross-contamination between beverage types.

SUMMARY

Accordingly, the present invention provides a cartridge containing one or more beverage ingredients and being formed from substantially air- and water-impermeable materials, the cartridge comprising an inlet for the introduction of an aqueous medium into the cartridge and an outlet for discharge of a beverage produced from the one or more beverage ingredients, wherein the cartridge comprises an outer member and an inner member conjoined on assembly with the outer member, characterised by the inner member comprising a discharge spout defining the outlet of the cartridge.

It will be understood that by the term "cartridge" as used herein is meant any package, container, sachet or receptacle which contains one or more beverage ingredients in the manner described. The cartridge may be rigid, semi-rigid or flexible.

The cartridge of the present invention contains one or more beverage ingredients suitable for the formation of a beverage product. The beverage product may be, for example, one of coffee, tea, chocolate or a dairy-based beverage including milk. The beverage ingredients may be powdered, ground, leaf-based or liquid. The beverage ingredients may be insoluble or soluble. Examples include roast and ground coffee, leaf tea, powdered chocolate and soup, liquid milk-based beverages, carbonated drinks and concentrated fruit juices.

The cartridge of the present invention is easily assembled with the main components being the inner member and the outer member. By using separate components for the inner and outer members which are then conjoined on assembly the manufacture of each component can be optimised. This is particularly advantageous in the cartridge of the present invention where very small tolerances are desirable since the beverage flow path through the cartridge is defined by the interface between the outer member and the inner member. In addition the components of the inner member and the outer member may more easily be sterilised prior to assembly when they are separated. Once the components are conjoined a number of small-apertured, tortuous pathways are created which cannot effectively be sterilised using known methods. The ability to sterilise the components is a particularly advantageous feature where the cartridges are used for dispensing dairy-based beverages. In addition, by using separate components which are conjoined, the cartridge is not required to be inverted during assembly since the joining of the inner member and optionally a filter, the filling of the beverage ingredients and the joining of a lid, such as a laminate, can all be carried out with the outer member in one orientation.

Advantageously, the inner member comprises the discharge spout. The discharge spout serves to direct the discharged beverage into a receptacle such as a cup. The discharge spout avoids excessive splashing or spraying of the beverage and is also useful in adjusting the flow characteristics of the beverage as it is transferred from the cartridge into the receptacle. For example, the discharge spout can be shaped to reduce the degree of turbulence imparted to the beverage to avoid unnecessary reduction in the quantity of bubbles contained in the beverage. Also advantageously, the cartridge itself comprises the discharge spout rather than providing a separate discharge spout or probe in a beverage preparation machine. Thus, there is no danger of cross-contamination of beverage types between dispense cycles since each discharge spout is used only once and then disposed of with the remainder of the cartridge. Also, preferably, the beverage discharged through the discharge spout will not contact the outlet mechanism of the beverage preparation machine thus avoiding soiling of the beverage preparation machine with beverage residue. Preferably, the discharge spout is integral with the inner member.

Advantageously, the discharge spout and inner member are moulded or otherwise formed as an integral, single unit which reduces the manufacturing cost of the cartridge and reduces the number of components which require assembly.

In one embodiment the discharge spout comprises a tapered portion. In an alternative embodiment, the discharge spout comprises a cylindrical portion. In a further optional variation, the discharge spout comprises a partition extending at least part way along the length of the discharge spout. The partition reduces the amount of spraying and splashing of beverage on discharge.

Preferably, a snap-fit arrangement is provided to conjoin the outer member and the inner member. Typically, the snap-fit arrangement comprises co-operating formations on the inner member and the outer member. A snap-fit arrangement provides a quick to assemble but secure method of conjoining the inner member and outer member. Advantageously, the snap-fit arrangement avoids the need for glues or other such adhesives in the interior of the cartridge which will be exposed to the beverage ingredients.

Preferably, the outer member comprises a closed first end and an open second end, wherein with the inner member conjoined to the outer member the outlet of the discharge spout is directed towards the open second end. Also preferably, the inlet is directed towards the open second end of the outer member. Thus the inlet and outlet are directed to the same side of the cartridge. This allows the cartridge to be used in a low-profile machine where piercing means for forming the inlet and the outlet, in use, project from a single plane of the beverage preparation machine.

Preferably, the outer member and inner member are conjoined at or near the closed first end of the outer member. Thus, the conjoining of the inner and outer members is achieved at a point remote from the open end, or mouth, of the outer member. Advantageously, the conjoining step can be done before beverage ingredients are filled into the cartridge and before sealing of the open end or mouth of the cartridge. This simplifies the assembly process since the inner and outer members may first be conjoined to form a cartridge sub-assembly which may then be transferred to a filling station on the packing line where the one or more beverage ingredients are inserted. The filled cartridge is then sealed, for example, by a laminated sheet which is heat welded to the open end of the outer member. This assembly process avoids the difficult task of aligning and keeping in alignment an outer member, inner member and laminate during the heat-welding step.

Preferably, the outer member comprises an inwardly directed extension which is received in a proximal end of the discharge spout on conjoining of the outer member and the inner member.

In one embodiment, the inner member comprises a frame having a filter disposed thereupon. Preferably, one or more passages are defined between the frame and a closed first end of the outer member when the inner member and outer member are conjoined. Further, the one or more passages are preferably delimited by webs extending upwardly from the frame to the closed first end of the outer member. Preferably, the one or more passages slope downwardly towards the discharge spout.

In another embodiment the inner member further comprises a skirt surrounding the discharge spout. Preferably, the skirt comprises an upper extension which, on assembly of the cartridge, contacts the closed first end of the cartridge. An upper rim of the upper extension preferably, engages a co-operating formation of the outer member to form a snap-fit arrangement for conjoining the inner member to the outer member. Typically, the co-operating formation of the outer member is an inwardly directed extension.

Preferably, the cartridge is disc-shaped. Optionally, the cartridge further comprises means for producing a jet of the beverage, which means comprises an aperture in a beverage flow path between the inlet and the outlet. The inlet and/or outlet is preferably covered by a substantially air- and water-impermeable material prior to the formation, in use, of the inlet and/or outlet in the cartridge. For example, the inlet and/or outlet is covered by a substantially air- and water-impermeable laminate. The laminate may be polypropylene. The outer member and/or inner member are formed, for example, from polypropylene. Alternatively, the outer member and/or inner member may be formed from a biodegradable polymer.

Preferably, the inner member forms a load-bearing member.

The discharge spout may comprise a constriction.

Preferably, there is also provided a plurality of cartridges, each cartridge as described above, wherein the percentage yield of the beverage produced from the one or more beverage ingredients contained in the cartridges is consistent to within 1.0 standard deviations.

In the following description the terms "upper" and "lower" and equivalents will be used to describe the relational positioning of features of the invention. The terms "upper" and "lower" and equivalents should be understood to refer to the cartridge (or other components) in its normal orientation for insertion into a beverage preparation machine and subsequent dispensing as shown, for example, in FIG. 4. In particular, "upper" and "lower" refer, respectively, to relative positions nearer or further from a top surface 11 of the cartridge. In addition, the terms "inner" and "outer" and equivalents will be used to describe the relational positioning of features of the invention. The terms "inner" and "outer" and equivalents should be understood to refer to relative positions in the cartridge (or other components) being, respectively, nearer or further from a centre or major axis X of the cartridge 1 (or other component).

Embodiments of the present invention will now be described, by way of example only, with reference to the accompanying drawings, in which:

BRIEF DESCRIPTION OF DRAWINGS

FIG. 1 is cross-sectional drawing of an outer member of first and second embodiments of cartridge according to the present invention;

FIG. 2 is a cross-sectional drawing of a detail of the outer member of FIG. 1 showing an inwardly directed cylindrical extension;

FIG. 3 is a cross-sectional drawing of a detail of the outer member of FIG. 1 showing a slot;

FIG. 4 is a perspective view from above of the outer member of FIG. 1;

FIG. 5 is a perspective view from above of the outer member of FIG. 1 in an inverted orientation;

FIG. 6 is a plan view from above of the outer member of FIG. 1;

FIG. 7 is a cross-sectional drawing of an inner member of the first embodiment of cartridge;

FIG. 8 is a perspective view from above of the inner member of FIG. 7;

FIG. 9 is a perspective view from above of the inner member of FIG. 7 in an inverted orientation;

FIG. 10 is a plan view from above of the inner member of FIG. 7;

FIG. 11 is a cross-sectional drawing of the first embodiment of cartridge in an assembled condition;

FIG. 12 is a cross-sectional drawing of an inner member of the second embodiment of cartridge;

FIG. 13 is a cross-sectional drawing of a detail of the inner member of FIG. 12 showing an aperture;

FIG. 14 is a perspective view from above of the inner member of FIG. 12;

FIG. 15 is a perspective view from above of the inner member of FIG. 12 in an inverted orientation;

FIG. 19 is cross-sectional drawing of an outer member of third and fourth embodiments of cartridge according to the present invention;

FIG. 20 is a cross-sectional drawing of a detail of the outer member of FIG. 19 showing an inwardly directed cylindrical extension;

FIG. 30 is a cross-sectional drawing of an inner member of the fourth embodiment of cartridge;

FIG. 31 is a plan view from above of the inner member of FIG. 30;

FIG. 32 is a perspective view from above of the inner member of FIG. 30;

FIG. 33 is a perspective view from above of the inner member of FIG. 30 in an inverted orientation;

DETAILED DESCRIPTION OF PREFERRED EMBODIMENTS

Figure 16:
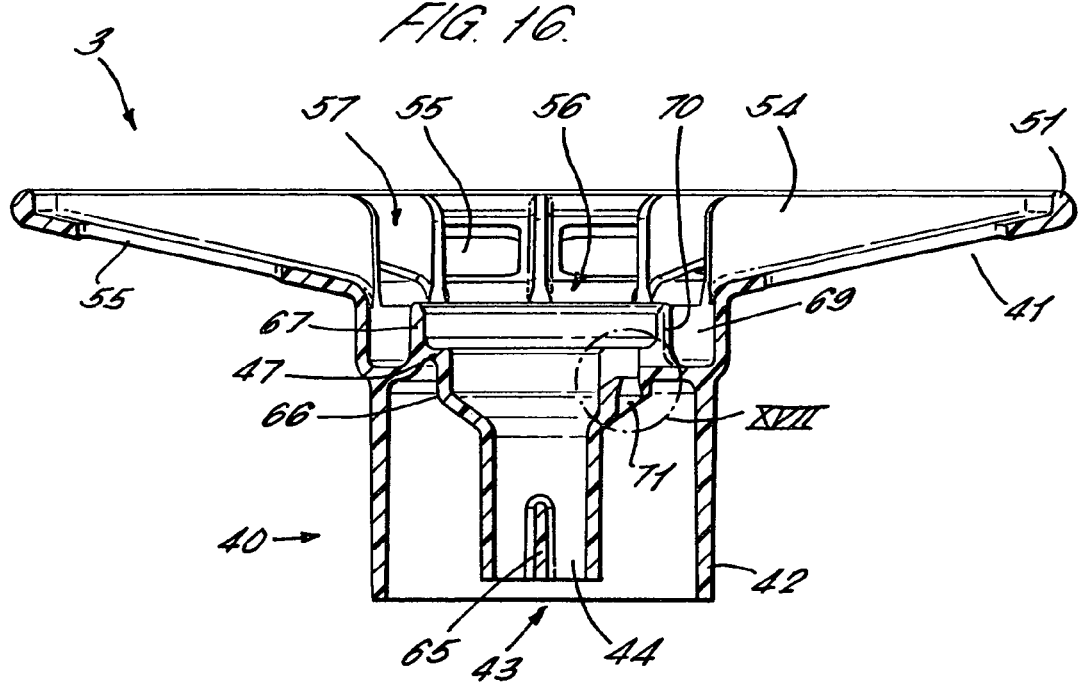
FIG. 16 is another cross-sectional drawing of the inner member of FIG. 12.

As shown in FIG. 11, the cartridge 1 of the present invention generally comprises an outer member 2, an inner member 3 and a laminate 5. The outer member 2, inner member 3 and laminate 5 are assembled to form the cartridge 1 which has an interior 120 for containing one or more beverage ingredients, an inlet 121, an outlet 122 and a beverage flow path linking the inlet 121 to the outlet 122 and which passes through the interior 120. The inlet 121 and outlet 122 are initially sealed by the laminate 5 and are opened in use by piercing or cutting of the laminate 5. The beverage flow path is defined by spatial inter-relationships between the outer member 2, inner member 3 and laminate 5 as discussed below. Other components may optionally be included in the cartridge 1, such as a filter 4, as will be described further below.

A first version of cartridge 1 which will be described for background purposes is shown in FIGS. 1 to 11. The first version of the cartridge 1 is particularly designed for use in dispensing filtered products such as roast and ground coffee or leaf tea. However, this version of the cartridge 1 and the other versions described below may be used with other products such as chocolate, coffee, tea, sweeteners, cordials, flavourings, alcoholic beverages, flavoured milk, fruit juices, squashes, sauces and desserts.

As can be seen from FIG. 5, the overall shape of the cartridge 1 is generally circular or disc-shaped with the diameter of the cartridge 1 being significantly greater than its height. A major axis X passes through the centre of the outer member as shown in FIG. 1. Typically the overall diameter of the outer member 2 is 74.5 mm±6 mm and the overall height is 16 mm±3 mm. Typically the volume of the cartridge 1 when assembled is 30.2 ml±20%.

The outer member 2 generally comprises a bowl-shaped shell 10 having a curved annular wall 13, a closed top 11 and an open bottom 12. The diameter of the outer member 2 is smaller at the top 11 compared to the diameter at the bottom 12, resulting from a flaring of the annular wall 13 as one traverses from the closed top 11 to the open bottom 12. The annular wall 13 and closed bottom 11 together define a receptacle having an interior 34.

A hollow inwardly directed cylindrical extension 18 is provided in the closed top 11 centred on the major axis X. As more clearly shown in FIG. 2, the cylindrical extension 18 comprises a stepped profile having first, second and third portions 19, 20 and 21. The first portion 19 is right circular cylindrical. The second portion 20 is frusto-conical in shape and is inwardly tapered. The third portion 21 is another right circular cylinder and is closed off by a lower face 31. The diameter of the first, second and third portion 19, 20 and 21 incrementally decreases such that the diameter of the cylindrical extension 18 decreases as one traverses from the top 11 to the closed lower face 31 of the cylindrical extension 18. A generally horizontal shoulder 32 is formed on the cylindrical extension 18 at the junction between the second and third portions 20 and 21.

An outwardly extending shoulder 33 is formed in the outer member 2 towards the bottom 12. The outwardly extending shoulder 33 forms a secondary wall 15 co-axial with the annular wall 13 so as to define an annular track forming a manifold 16 between the secondary wall 15 and the annular wall 13. The manifold 16 passes around the circumference of the outer member 2. A series of slots 17 are provided in the annular wall 13 level with the manifold 16 to provide gas and liquid communication between the manifold 16 and the interior 34 of the outer member 2. As shown in FIG. 3, the slots 17 comprise vertical slits in the annular wall 13. Between 20 and 40 slots are provided. In the embodiment shown thirty-seven slots 17 are provided generally equi-spaced around the circumference of the manifold 16. The slots 17 are preferably between 1.4 and 1.8 mm in length. Typically the length of each slot is 1.6 mm representing 10% of the overall height of the outer member 2. The width of each slot is between 0.25 and 0.35 mm. Typically, the width of each slot is 0.3 mm. The width of the slots 17 is sufficiently narrow to prevent the beverage ingredients passing therethrough into the manifold 16 either during storage or in use.

An inlet chamber 26 is formed in the outer member 2 at the periphery of the outer member 2. A cylindrical wall 27 is provided, as most clearly shown in FIG. 5, which defines the inlet chamber 26 within, and partitions the inlet chamber 26 from, the interior 34 of the outer member 2. The cylindrical wall 27 has a closed upper face 28 which is formed on a plane perpendicular to the major axis X and an open lower end 29 co-planar with the bottom 12 of the outer member 2. The inlet chamber 26 communicates with the manifold 16 via two slots 30 as shown in FIG. 1. Alternatively, between one and four slots may be used to communicate between the manifold 16 and the inlet chamber 26.

A lower end of the outwardly extending shoulder 33 is provided with an outwardly extending flange 35 which extends perpendicularly to the major axis X. Typically the flange 35 has a width of between 2 and 4 mm. A portion of the flange 35 is enlarged to form a handle 24 by which the outer member 2 may be held. The handle 24 is provided with an upturned rim 25 to improve grip.

The outer member 2 is formed as a single integral piece from high density polyethylene, polypropylene, polystyrene, polyester, or a laminate of two or more of these materials. A suitable polypropylene is the range of polymers available from DSM UK Limited (Redditch, United Kingdom). The outer member may be opaque, transparent or translucent. The manufacturing process may be injection moulding.

The inner member 3 as shown in FIGS. 7 to 10, comprises an annular frame 41 and a downwardly extending cylindrical funnel 40. A major axis X passes through the centre of the inner member 3 as shown in FIG. 7.

As best shown in FIG. 8, the annular frame 41 comprises an outer rim 51 and an inner hub 52 joined by ten equi-spaced radial spokes 53. The inner hub 52 is integral with and extends from the cylindrical funnel 40. Filtration apertures 55 are formed in the annular frame 41 between the radial spokes 53. A filter 4 is disposed on the annular frame 41 so as to cover the filtration apertures 55. The filter is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinyl chloride and/or polyethylene. The incorporation of these plastic materials into the cellulosic material renders the cellulosic material heat-sealable. The filter 4 may also be treated or coated with a material which is activated by heat and/or pressure so that it can be sealed to the annular frame 41 in this way.

As shown in the cross-sectional profile of FIG. 7, the inner hub 52 is located at a lower position than the outer rim 51, resulting in the annular frame 41 having a sloping lower profile.

The upper surface of each spoke 53 is provided with an upstanding web 54 which divides a void space above the annular frame 41 into a plurality of passages 57. Each passage 57 is bounded on either side by a web 54 and on a lower face by the filter 4. The passages 57 extend from the outer rim 51 downwardly towards, and open into, the cylindrical funnel 40 at openings 56 defined by the inner extremities of the webs 54.

The cylindrical funnel 40 comprises an outer tube 42 surrounding an inner discharge spout 43. The outer tube 42 forms the exterior of the cylindrical funnel 40. The discharge spout 43 is joined to the outer tube 42 at an upper end of the discharge spout 43 by means of an annular flange 47. The discharge spout 43 comprises an inlet 45 at an upper end which communicates with the openings 56 of the passages 57 and an outlet 44 at a lower end through which the prepared beverage is discharged into a cup or other receptacle. The discharge spout 43 comprises a frusto-conical portion 48 at an upper end and a cylindrical portion 58 at a lower end. The cylindrical portion 58 may have a slight taper such that it narrows towards the outlet 44. The frusto-conical portion 48 helps to channel beverage from the passages 57 down towards the outlet 44 without inducing turbulence to the beverage. An upper surface of the frusto-conical portion 48 is provided with four support webs 49 equi-spaced around the circumference of the cylindrical funnel 40. The support webs 49 define channels 50 therebetween. The upper edges of the support webs 49 are level with one another and perpendicular to the major axis X.

The inner member 3 may be formed as a single integral piece from polypropylene or a similar material as described above and by injection moulding in the same manner as the outer member 2.

Alternatively, the inner member 3 and/or the outer member 2 may be made from a biodegradable polymer. Examples of suitable materials include degradable polyethylene (for example, SPITEK supplied by Symphony Environmental, Borehamwood, United Kingdom), biodegradable polyester amide (for example, BAK 1095 supplied by Symphony Environmental), poly lactic acids (PLA supplied by Cargil, Minn., USA), starch-based polymers, cellulose derivatives and polypeptides.

The laminate 5 is formed from two layers, a first layer of aluminium and a second layer of cast polypropylene. The aluminium layer is between 0.02 and 0.07 mm in thickness. The cast polypropylene layer is between 0.025 and 0.065 mm in thickness. In one embodiment the aluminium layer is 0.06 mm and the polypropylene layer is 0.025 mm thick. This laminate is particularly advantageous as it has a high resistance to curling during assembly. As a result the laminate 5 may be pre-cut to the correct size and shape and subsequently transferred to the assembly station on the production line without undergoing distortion. Consequently, the laminate 5 is particularly well suited to welding. Other laminate materials may be used including PET/Aluminium/PP, PE/EVOH/PP, PET/metallised/PP and Aluminium/PP laminates. Roll laminate stock may be used instead of die cut stock.

The cartridge 1 may be closed by a rigid or semi-rigid lid instead of a flexible laminate.

Assembly of the cartridge 1 involves the following steps:
a) the inner member 3 is inserted into the outer member 2;
b) the filter 4 is cut to shape and placed onto the inner member 3 so to be received over the cylindrical funnel 40 and come to rest against the annular frame 41;
c) the inner member 3, outer member 2 and filter 4 are joined by ultrasonic welding;
d) the cartridge 1 is filled with one or more beverage ingredients;
e) the laminate 5 is affixed to the outer member 2.

These steps will be discussed in greater detail below.

The outer member 2 is orientated with the open bottom 12 directed upwards. The inner member 3 is then inserted into the outer member 2 with the outer rim 51 being received as a loose fit in an axial extension 14 at top 11 of the cartridge 1. The cylindrical extension 18 of the outer member 2 is at the same time received in the upper portion of the cylindrical funnel 40 of the inner member 3. The third portion 21 of the cylindrical extension 18 is seated inside the cylindrical funnel 40 with the closed lower face 31 of the cylindrical extension 18 bearing against the support webs 49 of the inner member 3. The filter 4 is then placed over the inner member 3 such that the filter material contacts the annular rim 51. An ultrasonic welding process is then used to join the filter 4 to the inner member 3 and at the same time, and in the same process step, the inner member 3 to the outer member 2. The inner member 3 and filter 4 are welded around the outer rim 51. The inner member 3 and outer member 2 are joined by means of weld lines around the outer rim 51 and also the upper edges of the webs 54.

As shown most clearly in FIG. 11, the outer member 2 and inner member 3 when joined together define a void space 130 in the interior 120 below the annular flange 41 and exterior the cylindrical funnel 40 which forms a filtration chamber. The filtration chamber 130 and passages 57 above the annular frame 41 are separated by the filter paper 4.

The filtration chamber 130 contains the one or more beverage ingredients 200. The one or more beverage ingredients are packed into the filtration chamber 130. For a filtered style beverage the ingredient is typically roast and ground coffee or leaf tea. The density of packing of the beverage ingredients in the filtration chamber 130 can be varied as desired. Typically, for a filtered coffee product the filtration chamber contains between 5.0 and 10.2 grams of roast and ground coffee in a filtration bed of thickness of typically 5 to 14 mm. Optionally, the interior 120 may contain one or more bodies, such as spheres, which are freely movable within the interior 120 to aid mixing by inducing turbulence and breaking down deposits of beverage ingredients during discharge of the beverage.

The laminate 5 is then affixed to the outer member 2 by forming a weld 126 around the periphery of the laminate 5 to join the laminate 5 to the lower surface of the outwardly extending flange 35. The weld 126 is extended to seal the laminate 5 against the lower edge of the cylindrical wall 27 of the inlet chamber 26. Further, a weld 125 is formed between the laminate 5 and the lower edge of the outer tube 42 of the cylindrical funnel 40. The laminate 5 forms the lower wall of the filtration chamber 130 and also seals the inlet chamber 26 and cylindrical funnel 40. However, a small gap 123 exists prior to dispensation between the laminate 5 and the lower edge of the discharge spout 43. A variety of welding methods may be used, such as heat and ultrasonic welding, depending on the material characteristics of the laminate 5.

Advantageously, the inner member 3 spans between the outer member 2 and the laminate 5. The inner member 3 is formed from a material of relative rigidity, such as polypropylene. As such, the inner member 3 forms a load-bearing member that acts to keep the laminate 5 and outer member 2 spaced apart when the cartridge 1 is compressed. It is preferred that the cartridge 1 is subjected to a compressive load of between 130 and 280N in use. The compressive force acts to prevent the cartridge failing under internal pressurisation and also serves to squeeze the inner member 3 and outer member 2 together. This ensures that the internal dimensions of passageways and apertures in the cartridge 1 are fixed and unable to change during pressurisation of the cartridge 1.

To use the cartridge 1 it is first inserted into a beverage preparation machine and the inlet 121 and outlet 122 are opened by piercing members of the beverage preparation machine which perforate and fold back the laminate 5. An aqueous medium, typically water, under pressure enters the cartridge 1 through the inlet 121 into the inlet chamber 26 at a pressure of between 0.1-2.0 bar. From there the water is directed to flow through the slots 30 and round the manifold 16 and into the filtration chamber 130 of the cartridge 1 through the plurality of slots 17. The water is forced radially inwardly through the filtration chamber 130 and mixes with the beverage ingredients 200 contained therein. The water is at the same time forced upwardly through the beverage ingredients. The beverage formed by passage of the water through the beverage ingredients passes through the filter 4 and filtration apertures 55 into the passages 57 lying above the annular frame 41. The sealing of the filter 4 onto the spokes 53 and the welding of the rim 51 with the outer member 2 ensures that there are no short-circuits and all the beverage has to pass through the filter 4.

The beverage then flows downwardly along the radial passages 57 formed between the webs 54 and through the openings 56 and into the cylindrical funnel 40. The beverage passes along the channels 50 between the support webs 47 and down the discharge spout 43 to the outlet 44 where the beverage is discharged into a receptacle such as a cup.

Preferably, the beverage preparation machine comprises an air purge facility, wherein compressed air is forced through the cartridge 1 at the end of the dispense cycle to flush out the remaining beverage into the receptacle.

A second version of cartridge 1 is shown in FIGS. 12 to 18. The second version of the cartridge 1 is particularly designed for use in dispensing espresso-style products such as roast and ground coffee where it is desirable to produce a beverage having a froth of tiny bubbles known as a crema. Many of the features of the second version of the cartridge 1 are the same as in the first version and like numerals have been used to reference like features. In the following description the differences between the first and second versions will be discussed. Common features which function in the same manner will not be discussed in detail.

The outer member 2 is of the same construction as in the first version of cartridge 1 and as shown in FIGS. 1 to 6.

The annular frame 41 of the inner member 3 is the same as in the first version. Also, a filter 4 is disposed on the annular frame 41 so as to cover the filtration apertures 55. The outer tube 42 of the cylindrical funnel 40 is also as before. However, there are a number of differences in the construction of the inner member 2 of the second version compared to the first version. As shown in FIG. 16, the discharge spout 43 is provided with a partition 65 which extends part way up the discharge spout 43 from the outlet 44. The partition 65 helps to prevent the beverage spraying and/or splashing as it exits the discharge spout 43. The profile of the discharge spout 43 is also different and comprises a stepped profile with a distinct dog-leg 66 near an upper end of the tube 43.

A rim 67 is provided upstanding from the annular flange 47 joining the outer tube 42 to the discharge spout 43. The rim 67 surrounds the inlet 45 to the discharge spout 43 and defines an annular channel 69 between the rim 67 and the upper portion of the outer tube 42. The rim 67 is provided with an inwardly directed shoulder 68. At one point around the circumference of the rim 67 an aperture 70 is provided in the form of a slot which extends from an upper edge of rim 67 to a point marginally below the level of the shoulder 68 as most clearly shown in FIGS. 12 and 13. The slot has a width of 0.64 mm.

Figure 17:
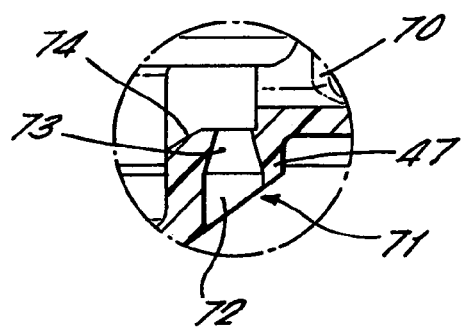
FIG. 17 is a cross-sectional drawing of another detail of the inner member of FIG. 12 showing an air inlet.

An air inlet 71 is provided in annular flange 47 circumferentially aligned with the aperture 70 as shown in FIGS. 16 and 17. The air inlet 71 comprises an aperture passing through the flange 47 so as to provide communication between a point above the flange 47 and the void space below the flange 47 between the outer tube 42 and discharge spout 43. Preferably, and as shown, the air inlet 71 comprises an upper frusto-conical portion 73 and a lower cylindrical portion 72. The air inlet 71 is typically formed by a mould tool such as a pin. The tapered profile of the air inlet 71 allows the mould tool to be more easily removed from the moulded component. The wall of the outer tube 42 in the vicinity of the air inlet 71 is shaped to form a chute 75 leading from the air inlet 71 to the inlet 45 of the discharge spout 43. As shown in FIG. 17, a canted shoulder 74 is formed between the air inlet 71 and the chute 75 to ensure that the jet of beverage issuing from the slot 70 does not immediately foul on the upper surface of the flange 47 in the immediate vicinity of the air inlet 71.

Figure 18:
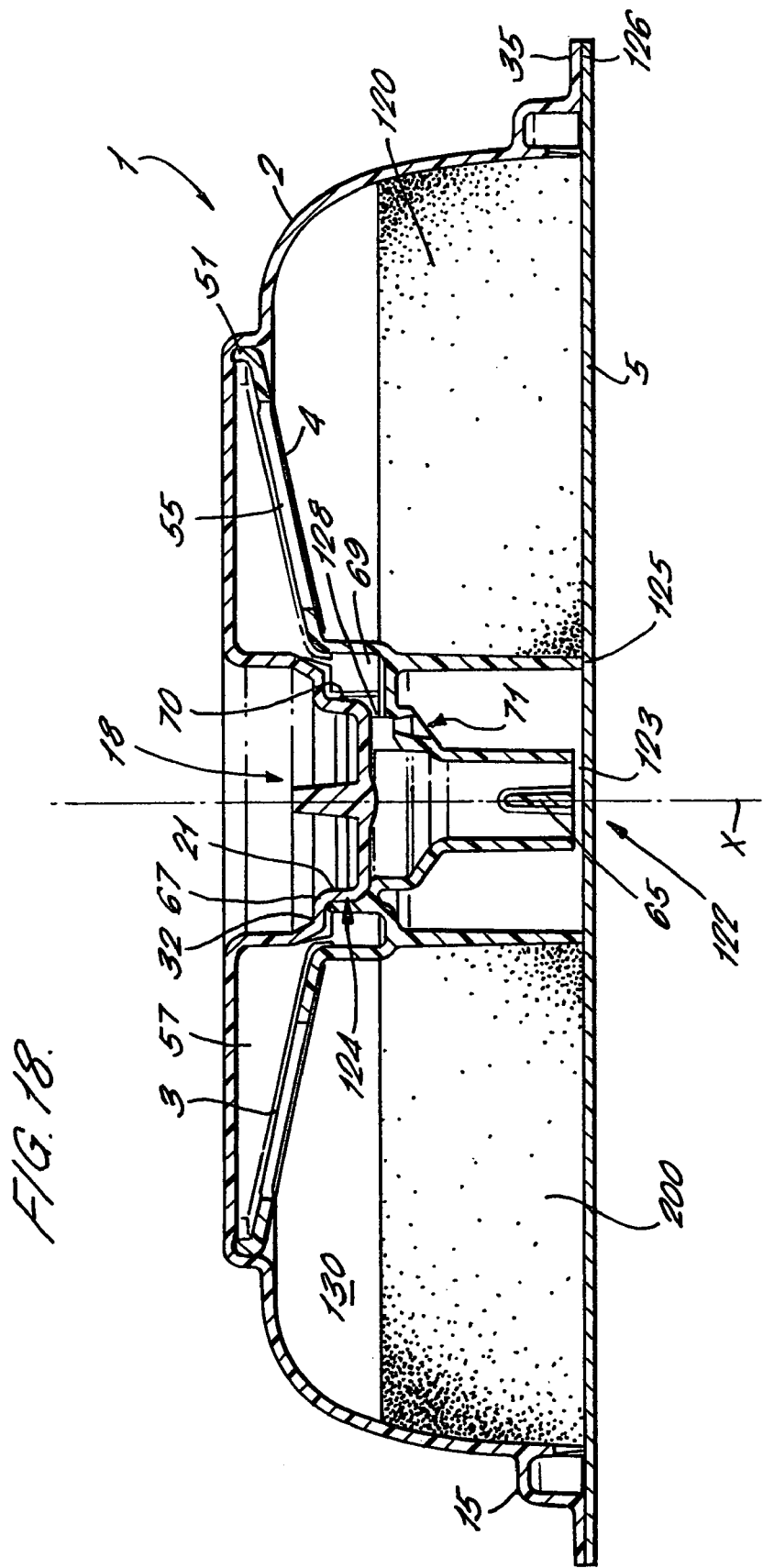
FIG. 18 is a cross-sectional drawing of the second embodiment of cartridge in an assembled condition.
Figure 21:
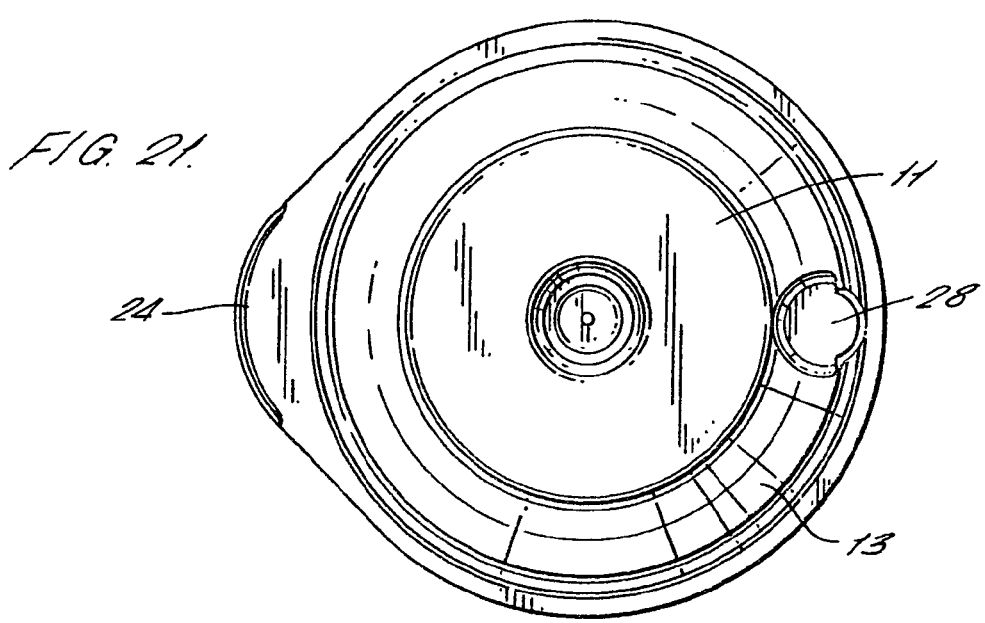
FIG. 21 is a plan view from above of the outer member of FIG. 19.
Figure 22:
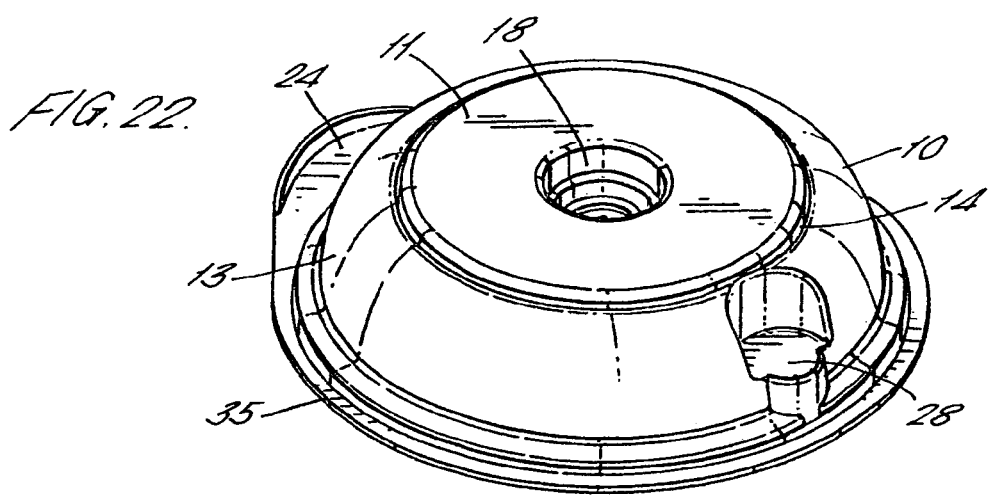
FIG. 22 is a perspective view from above of the outer member of FIG. 19.

The assembly procedure for the second version of cartridge 1 is similar to the assembly of the first version. However, there are certain differences. As shown in FIG. 18, the third portion 21 of the cylindrical extension 18 is seated inside the support rim 67 rather than against support webs. The shoulder 32 of the cylindrical extension 18 between the second portion 20 and third portion 21 bears against the upper edge of the support rim 67 of the inner member 3. An interface zone 124 is thus formed between the inner member 3 and the outer member 2 comprising a face seal between the cylindrical extension 18 and the support rim 67 which extends around nearly the whole circumference of the cartridge 1. The seal between the cylindrical extension 18 and the support rim 67 is not fluid-tight though since the slot 70 in the support rim 67 extends through the support rim 67 and downwardly to a point marginally below the shoulder 68. Consequently the interface fit between the cylindrical extension 18 and the support rim 67 transforms the slot 70 into an aperture 128, as most clearly shown in FIG. 18, providing gas and liquid communication between the annular channel 69 and the discharge spout 43. The aperture is typically 0.64 mm wide by 0.69 mm long.

Operation of the second version of cartridge 1 to dispense a beverage is similar to the operation of the first version but with certain differences. Beverage in the radial passages 57 flows downwardly along the passages 57 formed between the webs 54 and through the openings 56 and into the annular channel 69 of the cylindrical funnel 40. From the annular channel 69 the beverage is forced under pressure through the aperture 128 by the back pressure of beverage collecting in the filtration chamber 130 and passages 57. The beverage is thus forced through aperture 128 as a jet and into an expansion chamber formed by the upper end of the discharge spout 43. As shown in FIG. 18, the jet of beverage passes directly over the air inlet 71. As the beverage enters the discharge spout 43 the pressure of the beverage jet drops. As a result air is entrained into the beverage stream in the form of a multitude of small air bubbles as the air is drawn up through the air inlet 71. The jet of beverage issuing from the aperture 128 is funnelled downwards to the outlet 44 where the beverage is discharged into a receptacle such as a cup where the air bubbles form the desired crema. Thus, the aperture 128 and the air inlet 71 together form an eductor which acts to entrain air into the beverage. Flow of beverage into the eductor should be kept as smooth as possible to reduce pressure losses. Advantageously, the walls of the eductor should be made concave to reduce losses due to 'wall effect' friction. The dimensional tolerance of the aperture 128 is small. Preferably the aperture size is fixed plus or minus 0.02 mm². Hairs, fibrils or other surface irregularities can be provided within or at the exit of the eductor to increase the effective cross-sectional area which has been found to increase the degree of air entrainment.

A third version of cartridge 1 is shown in FIGS. 19 to 29. The third version of the cartridge 1 is particularly designed for use in dispensing soluble products which may be in powdered, liquid, syrup, gel or similar form. The soluble product is dissolved by or forms a suspension in, an aqueous medium such as water when the aqueous medium is passed, in use, through the cartridge 1. Examples of beverages include chocolate, coffee, milk, tea, soup or other rehydratable or aqueous-soluble products. Many of the features of the third version of the cartridge 1 are the same as in the previous versions and like numerals have been used to reference like features. In the following description the differences between the third and previous versions will be discussed. Common features which function in the same manner will not be discussed in detail.

Compared to the outer member 2 of the previous versions, the hollow inwardly directed cylindrical extension 18 of the outer member 2 of the third version has a larger overall diameter as shown in FIG. 20. In particular the diameter of the first portion 19 is typically between 16 and 18 mm compared to 13.2 mm for the outer member 2 of the previous versions. In addition, the first portion 19 is provided with a convex outer surface 19a, or bulge, as most clearly shown in FIG. 20, the function of which will be described below. The diameter of the third portions 21 of the cartridges 1 are however the same resulting in the area of the shoulder 32 being greater in this, the third version of the cartridge 1. Typically the volume of the cartridge 1 when assembled is 32.5 ml±20%.

Figure 23:
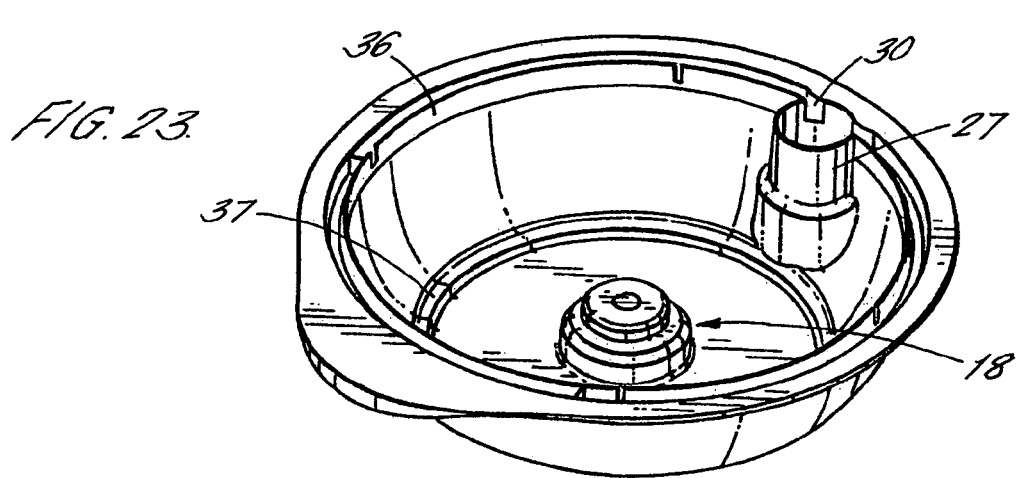
FIG. 23 is a perspective view from above of the outer member of FIG. 19 in an inverted orientation.
Figure 24:
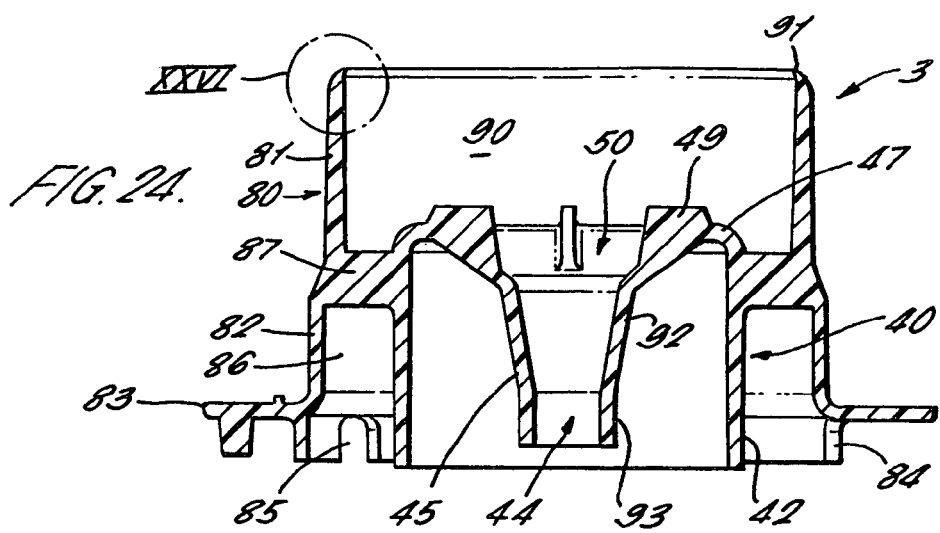
FIG. 24 is a cross-sectional drawing of an inner member of the third embodiment of cartridge.
Figure 25:
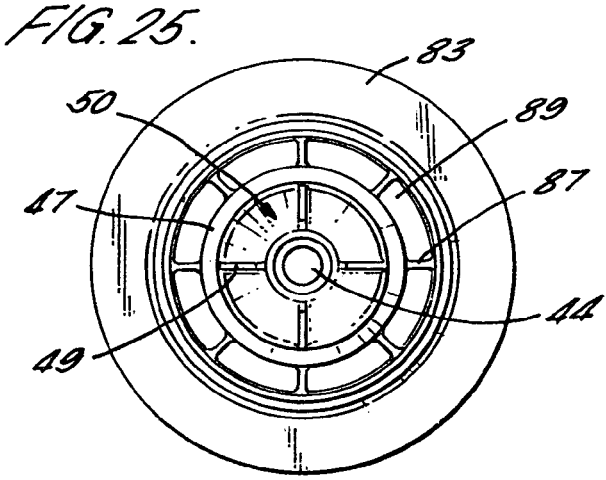
FIG. 25 is a plan view from above of the inner member of FIG. 24.

The number and positioning of the slots in the lower end of the annular wall 13 is also different. Between 3 and 5 slots are provided. In the embodiment as shown in FIG. 23, four slots 36 are provided equi-spaced around the circumference of the manifold 16. The slots 36 are slightly wider than in the previous versions of the cartridge 1 being between 0.35 and 0.45 mm, preferably 0.4 mm wide.

In other respects the outer members 2 of the cartridges 1 are the same.

The construction of the cylindrical funnel 40 of the inner member 3 is the same as in the first version of cartridge 1 with an outer tube 42, discharge spout 45, annular flange 47 and support webs 49 being provided. The only difference is that the discharge spout 45 is shaped with an upper frusto-conical section 92 and a lower cylindrical section 93.

Figure 26:
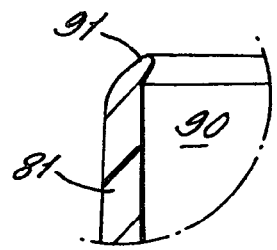
FIG. 26 is a cross-sectional drawing of a detail of the inner member of FIG. 24 showing an in-turned upper rim.
Figure 27:
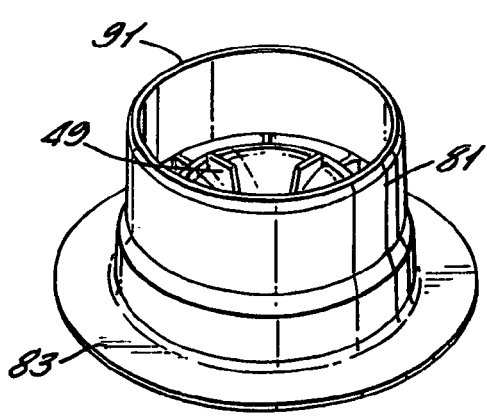
FIG. 27 is a perspective view from above of the inner member of FIG. 24.
Figure 28:
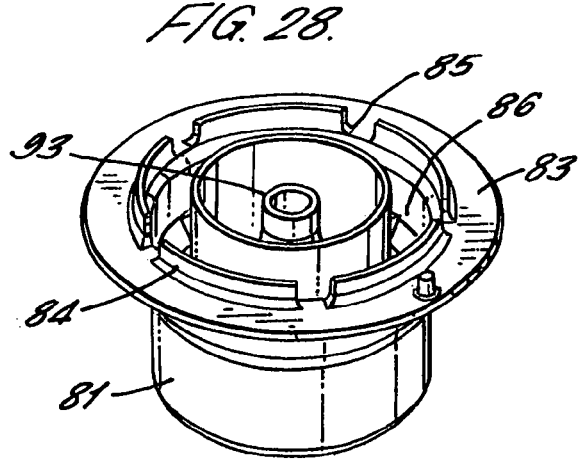
FIG. 28 is a perspective view from above of the inner member of FIG. 24 in an inverted orientation.

In contrast to the previous versions and as shown in FIGS. 24 to 28, the annular frame 41 is replaced by a skirt portion 80 which surrounds the cylindrical funnel 40 and is joined thereto by means of eight radial struts 87 which adjoin the cylindrical funnel 40 at or near the annular flange 47. A cylindrical extension 81 of the skirt portion 80 extends upwardly from the struts 87 to define a chamber 90 with an open upper face. An upper rim 91 of the cylindrical extension 81 has an in-turned profile as shown in FIG. 26. An annular wall 82 of the skirt portion 80 extends downwardly from the struts 87 to define an annular channel 86 between the skirt portion 80 and the outer tube 42.

The annular wall 82 comprises at a lower end an exterior flange 83 which lies perpendicular to the major axis X. A rim 84 depends downwardly from a lower surface of the flange 83 and contains five apertures 85 which are circumferentially equi-spaced around the rim 84. Thus, the rim 84 is provided with a castellated lower profile.

Apertures 89 are provided between the struts 87 allowing communication between the chamber 90 and the annular channel 86.

Figure 29:
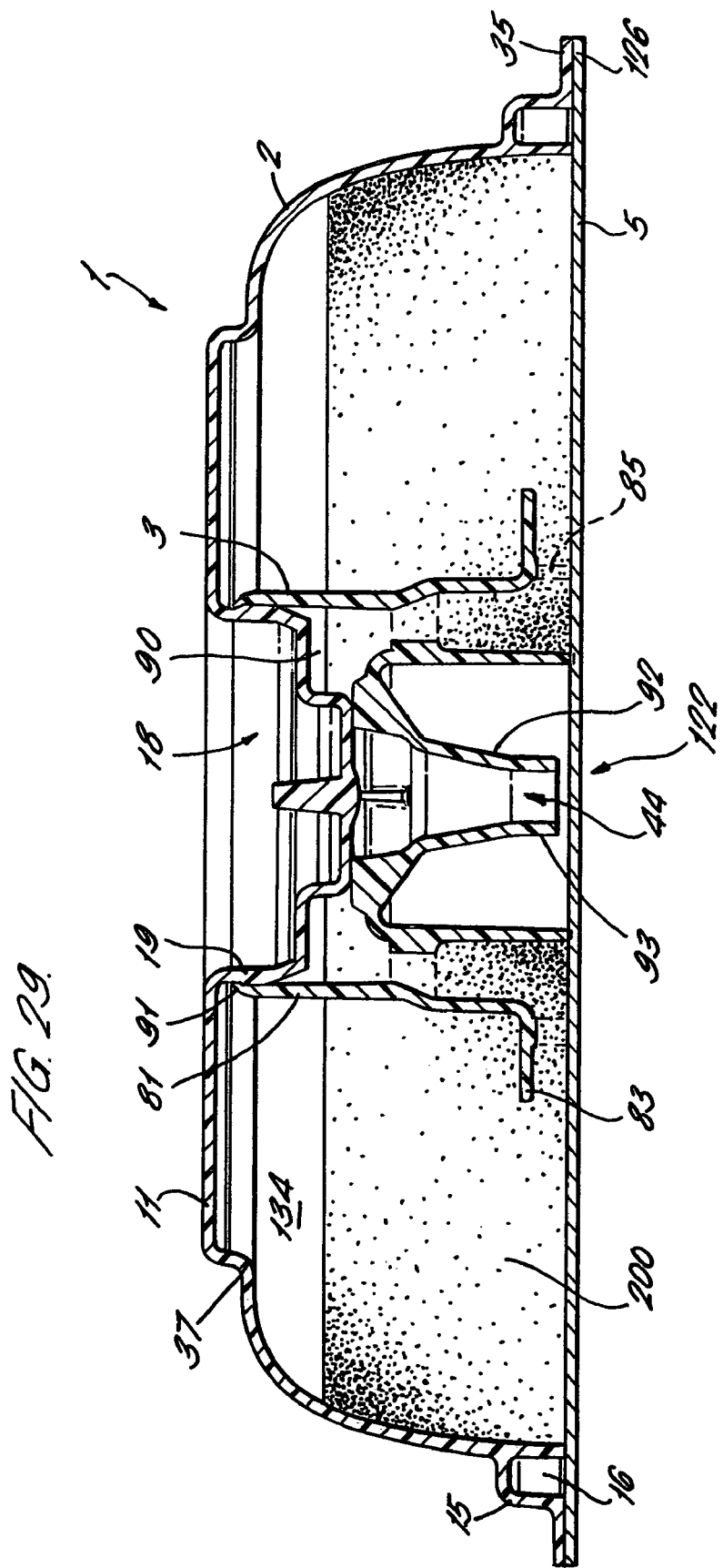
FIG. 29 is a cross-sectional drawing of the third embodiment of cartridge in an assembled condition.

The assembly procedure for the third version of cartridge 1 is similar to the assembly of the first version but with certain differences. The outer member 2 and inner member 3 are push-fitted together as shown in FIG. 29 and retained by means of a snap-fit arrangement rather than welded together. On joining the two members the inwardly directed cylindrical extension 18 is received inside the upper cylindrical extension 81 of the skirt portion 80. The inner member 3 is retained in the outer member 2 by frictional interengagement of the convex outer surface 19a of the first portion 19 of the cylindrical extension 18 with the in-turned rim 91 of the upper cylindrical extension 81. With the inner member 3 located in the outer member 2 a mixing chamber 134 is defined located exterior to the skirt portion 80. The mixing chamber 134 contains the beverage ingredients 200 prior to dispensation. It should be noted that the four inlets 36 and the five apertures 85 are staggered circumferentially with respect to one another. The radial location of the two parts relative to each other need not be determined or fixed during assembly since the use of four inlets 36 and five apertures 85 ensures that misalignment occurs between the inlets and apertures whatever the relative rotational positioning of the components.

The one or more beverage ingredients are packed into the mixing chamber 134 of the cartridge. The density of packing of the beverage ingredients in the mixing chamber 134 can be varied as desired.

The laminate 5 is then affixed to the outer member 2 and inner member 3 in the same manner as described above in the previous versions.

In use, water enters the mixing chamber 134 through the four slots 36 in the same manner as previous versions of the cartridge. The water is forced radially inwardly through the mixing chamber and mixes with the beverage ingredients contained therein. The product is dissolved or mixed in the water and forms the beverage in the mixing chamber 134 and is then driven though the apertures 85 into the annular channel 86 by back pressure of beverage and water in the mixing chamber 134. The circumferential staggering of the four inlet slots 36 and the five apertures 85 ensures that jets of water are not able to pass radially directly from the inlet slots 36 to the apertures 85 without first circulating within the mixing chamber 134. In this way the degree and consistency of dissolution or mixing of the product is significantly increased. The beverage is forced upwardly in the annular channel 86, through the apertures 89 between the struts 87 and into the chamber 90. The beverage passes from chamber 90 through the inlets 45 between the support webs 49 into the discharge spout 43 and towards the outlet 44 where the beverage is discharged into a receptacle such as a cup. The cartridge finds particular application with beverage ingredients in the form of viscous liquids or gels. In one application a liquid chocolate ingredient is contained in the cartridge 1 with a viscosity of between 1700 and 3900 mPa at ambient temperature and between 5000 and 10000 mPa at 0° C. and a refractive solids of 67 Brix±3. In another application liquid coffee is contained in the cartridge 1 with a viscosity of between 70 and 2000 mPa at ambient and between 80 and 5000 mPa at 0° C. where the coffee has a total solids level of between 40 and 70%.

A fourth version of cartridge 1 is shown in FIGS. 30 to 34. The fourth version of the cartridge 1 is particularly designed for use in dispensing liquid products such as concentrated liquid milk. Many of the features of the fourth version of the cartridge 1 are the same as in the previous versions and like numerals have been used to reference like features. In the following description the differences between the fourth and previous versions will be discussed. Common features which function in the same manner will not be discussed in detail.

The outer member 2 is the same as in the third version of cartridge 1 and as shown in FIGS. 19 to 23.

The cylindrical funnel 40 of the inner member 3 is similar to that shown in the second version of cartridge 1 but with certain differences. As shown in FIG. 30 the discharge spout 43 is shaped with an upper frusto-conical section 106 and a lower cylindrical section 107. Three axial ribs 105 are provided on the inner surface of the discharge spout 43 to direct the dispensed beverage downwards towards the outlet 44 and prevent the discharged beverage from spinning within the spout. Consequently, the ribs 105 act as baffles. As in the second version of cartridge 1, an air inlet 71 is provided through the annular flange 47. However, the chute 75 beneath the air inlet 71 is more elongated than in the second version.

A skirt portion 80 is provided similar to that shown in the third version of the cartridge 1 described above. Between 5 and 12 apertures 85 are provided in the rim 84. Typically ten apertures are provided rather than the five provided in the third version of cartridge 1.

An annular bowl 100 is provided extending from and integral with the flange 83 of the skirt portion 80. The annular bowl 100 comprises a flared body 101 with an open upper mouth 104 which is directed upwards. Four feed apertures 103 shown in FIGS. 30 and 31 are located in the body 101 at or near the lower end of the bowl 100 where it joins the skirt portion 80. Preferably, the feed apertures are equi-spaced around the circumference of the bowl 100.

The laminate 5 is of the type described above in the previous embodiments.

The assembly procedure for the fourth version of cartridge 1 is the same as that for the third version.

Figure 34:
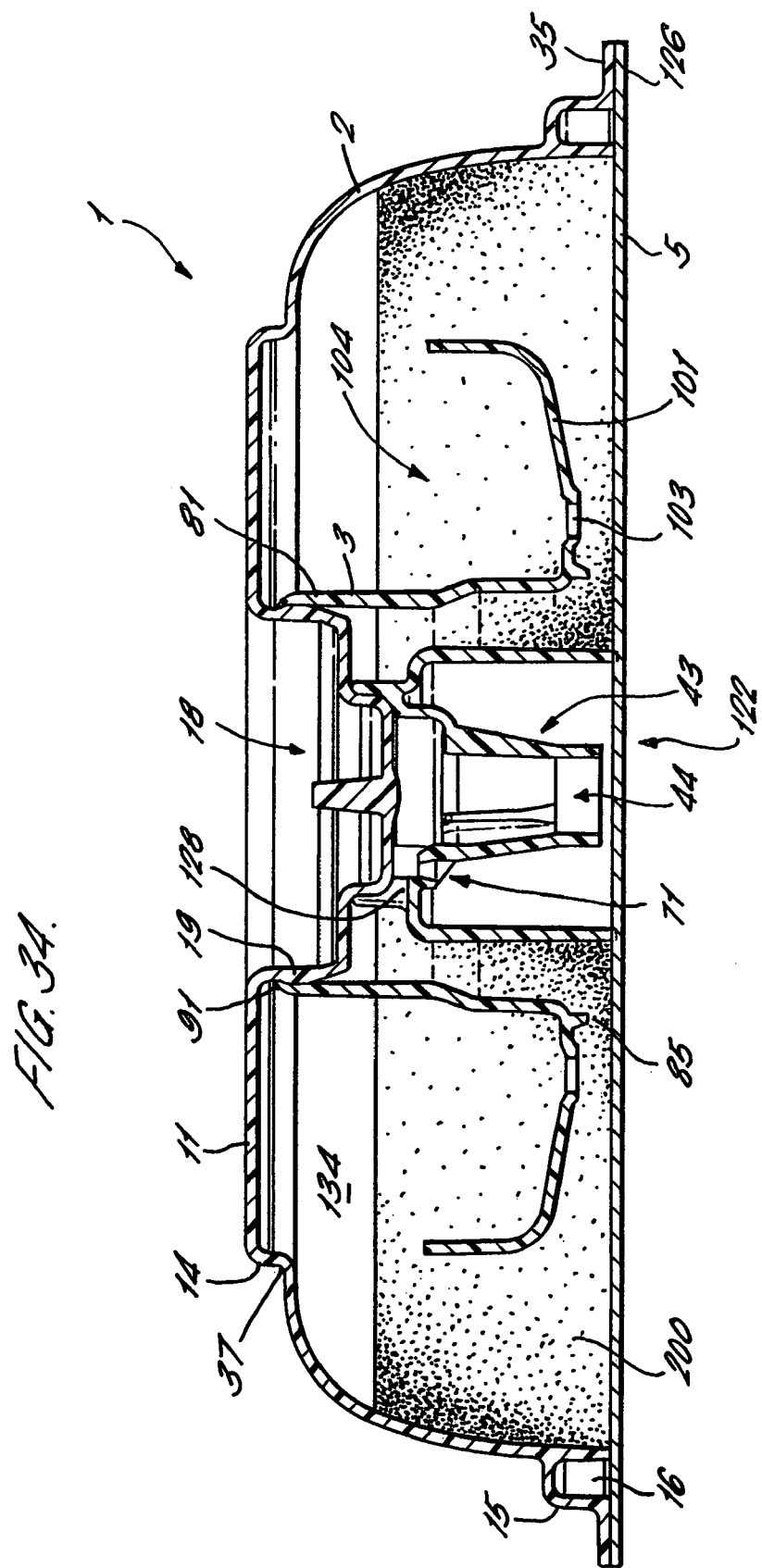
FIG. 34 is a cross-sectional drawing of the fourth embodiment of cartridge in an assembled condition.

Operation of the fourth version of cartridge is similar to that of the third version. The water enters the cartridge 1 and the mixing chamber 134 in the same manner as before. There the water mixes with and dilutes the liquid product which is then forced out through the apertures 85 towards the outlet 44 as described above. A proportion of the liquid product is initially contained within the annular bowl 100 as shown in FIG. 34 and is not subject to immediate dilution by the water entering the mixing chamber 134. The diluted liquid product in the lower part of the mixing chamber 134 will tend to exit through apertures 85 rather than be forced up and into the annular bowl 100 through upper mouth 104. Consequently, the liquid product in the annular bowl 100 will remain relatively concentrated compared to the product in the lower part of the mixing chamber 134. The liquid product in the annular bowl 100 drips through the feed apertures 103 into the stream of product exiting the mixing chamber 134 through the apertures 85. The annular bowl 100 acts to even out the concentration of the diluted liquid product entering the cylindrical funnel 40 by holding back a proportion of the concentrated liquid product and releasing it into the exiting liquid stream more steadily throughout the dispensation cycle.

From the annular channel 86 the beverage is forced under pressure through the aperture 128 by the back pressure of beverage collecting in the filtration chamber 134 and chamber 90. The beverage is thus forced through aperture 128 as a jet and into an expansion chamber formed by the upper end of the discharge spout 43. As shown in FIG. 34, the jet of beverage passes directly over the air inlet 71. As the beverage enters the discharge spout 43 the pressure of the beverage jet drops. As a result air is entrained into the beverage stream in the form of a multitude of small air bubbles as the air is drawn up through the air inlet 71. The jet of beverage issuing from the aperture 128 is funnelled downwards to the outlet 44 where the beverage is discharged into a receptacle such as a cup where the air bubbles form the desired frothy appearance.

Advantageously, the inner member 3, outer member 2, laminate 5 and filter 4 can all be readily sterilised due to the components being separable and not individually comprising tortuous passageways or narrow crevices. Rather, it is only after conjoining the components, after sterilisation, that the necessary passageways are formed. This is particularly important where the beverage ingredient is a dairy-based product such as liquid milk concentrate.

The fourth embodiment of beverage cartridge is particularly advantageous for dispensing a concentrated dairy-based liquid product such as liquid milk. Previously, powdered milk products have been provided in the form of sachets for adding to a pre-prepared beverage. However, for a cappuccino-style beverage it is necessary to foam the milk. This has been achieved previously by passing steam through a liquid milk product. However this necessitates the provision of a steam supply which increases the cost and complexity of the machine used to dispense the beverage. The use of steam also increases the risk of injury during operation of the cartridge. Accordingly the present invention provides for a beverage cartridge having a concentrated dairy-based liquid product therein. It has been found that by concentrating the milk product a greater amount of foam can be produced for a particular volume of milk when compared to fresh or UHT milk. This reduces the size required for the milk cartridge. Fresh semi-skimmed milk contains approximately 1.6% fat and 10% total solids. The concentrated liquid milk preparations of the present invention contain between 3 and 10% fat and 25 to 40% total solids. In a typical example, the preparation contains 4% fat and 30% total solids. The concentrated milk preparations are suitable for foaming using a low pressure preparation machine as will be described below. In particular, foaming of the milk is achieved at pressures below 2 bar, preferably approximately 1.5 bar using the cartridge of the fourth embodiment described above.

The cartridge of the fourth embodiment is also advantageous in dispensing liquid coffee products.

It has been found that the embodiments of beverage cartridge of the present invention advantageously provide an improved consistency of the dispensed beverage when compared to prior art cartridges. Reference is made to Table 1 below which shows the results of brew yields for twenty samples each of cartridges A and B containing roast and ground coffee. Cartridge A is a beverage cartridge according to the first embodiment of the present invention. Cartridge B is a prior art beverage cartridge as described in the applicant's document WO01/58786. The refractive index of the brewed beverage is measured in Brix units and converted to a percentage of soluble solids (% SS) using standard tables and formulae. In the examples below:

% $SS = 0.7774*(\text{Brix value}) + 0.0569$.

% Yield = (% $SS$*Brew Volume (g))/(100*Coffee Weight (g))

TABLE 1

| Sample | Brew Volume (g) | Coffee Weight (g) | Brix | % SS (*) | % Yield |
|---|---|---|---|---|---|
| CARTRIDGE A | | | | | |
| 1 | 105.6 | 6.5 | 1.58 | 1.29 | 20.88 |
| 2 | 104.24 | 6.5 | 1.64 | 1.33 | 21.36 |
| 3 | 100.95 | 6.5 | 1.67 | 1.36 | 21.05 |
| 4 | 102.23 | 6.5 | 1.71 | 1.39 | 21.80 |

TABLE 1-continued

| Sample | Brew Volume (g) | Coffee Weight (g) | Brix | % SS (*) | % Yield |
|---|---|---|---|---|---|
| 5 | 100.49 | 6.5 | 1.73 | 1.40 | 21.67 |
| 6 | 107.54 | 6.5 | 1.59 | 1.29 | 21.39 |
| 7 | 102.70 | 6.5 | 1.67 | 1.36 | 21.41 |
| 8 | 97.77 | 6.5 | 1.86 | 1.50 | 22.61 |
| 9 | 97.82 | 6.5 | 1.7 | 1.38 | 20.75 |
| 10 | 97.83 | 6.5 | 1.67 | 1.36 | 20.40 |
| 11 | 97.6 | 6.5 | 1.78 | 1.44 | 21.63 |
| 12 | 106.64 | 6.5 | 1.61 | 1.31 | 21.47 |
| 13 | 99.26 | 6.5 | 1.54 | 1.25 | 19.15 |
| 14 | 97.29 | 6.5 | 1.59 | 1.29 | 19.35 |
| 15 | 101.54 | 6.5 | 1.51 | 1.23 | 19.23 |
| 16 | 104.23 | 6.5 | 1.61 | 1.31 | 20.98 |
| 17 | 97.5 | 6.5 | 1.73 | 1.40 | 21.03 |
| 18 | 100.83 | 6.5 | 1.68 | 1.36 | 21.14 |
| 19 | 101.67 | 6.5 | 1.67 | 1.36 | 21.20 |
| 20 | 101.32 | 6.5 | 1.68 | 1.36 | 21.24 |
| | | | | AVERAGE | 20.99 |
| CARTRIDGE B | | | | | |
| 1 | 100.65 | 6.5 | 1.87 | 1.511 | 23.39 |
| 2 | 95.85 | 6.5 | 1.86 | 1.503 | 22.16 |
| 3 | 98.4 | 6.5 | 1.8 | 1.456 | 22.04 |
| 4 | 92.43 | 6.5 | 2.3 | 1.845 | 26.23 |
| 5 | 100.26 | 6.5 | 1.72 | 1.394 | 21.50 |
| 6 | 98.05 | 6.5 | 2.05 | 1.651 | 24.90 |
| 7 | 99.49 | 6.5 | 1.96 | 1.581 | 24.19 |
| 8 | 95.62 | 6.5 | 2.3 | 1.845 | 27.14 |
| 9 | 94.28 | 6.5 | 2.17 | 1.744 | 25.29 |
| 10 | 96.13 | 6.5 | 1.72 | 1.394 | 20.62 |
| 11 | 96.86 | 6.5 | 1.81 | 1.464 | 21.82 |
| 12 | 94.03 | 6.5 | 2.2 | 1.767 | 25.56 |
| 13 | 96.28 | 6.5 | 1.78 | 1.441 | 21.34 |
| 14 | 95.85 | 6.5 | 1.95 | 1.573 | 23.19 |
| 15 | 95.36 | 6.5 | 1.88 | 1.518 | 22.28 |
| 16 | 92.73 | 6.5 | 1.89 | 1.526 | 21.77 |
| 17 | 88 | 6.5 | 1.59 | 1.293 | 17.50 |
| 18 | 93.5 | 6.5 | 2.08 | 1.674 | 24.08 |
| 19 | 100.88 | 6.5 | 1.75 | 1.417 | 22.00 |
| 20 | 84.77 | 6.5 | 2.37 | 1.899 | 24.77 |
| | | | | AVERAGE | 23.09 |

Performing a t-test statistical analysis on the above data gives the following results:

TABLE 2

| t-Test: Two-Sample Assuming Equal Variances | | |
|---|---|---|
| | % Yield (Cartridge A) | % Yield (Cartridge B) |
| Mean | 20.99 | 23.09 |
| Variance | 0.77 | 5.04 |
| Observations | 20 | 20 |
| Pooled Variance | 2.90 | |
| Hypothesized Mean Difference | 0 | |
| df | 38 | |
| t Stat | −3.90 | |
| P(T <= t) one-tail | 0.000188 | |
| t Critical one-tail | 1.686 | |
| P(T <= t) two-tail | 0.000376 | |
| t Critical two-tail | 2.0244 | |
| Standard Deviation | 0.876 | 2.245 |

The analysis shows that the consistency of % yield, which equates to brew strength, for the cartridges of the present invention is significantly better (at a 95% confidence level) than the prior art cartridges, with a standard deviation of 0.88% compared to 2.24%. This means that beverages dispensed with the cartridges of the present invention have a more repeatable and uniform strength. This is preferred by consumers who like their drinks to taste the same time after time and do not want arbitrary changes in drink strength.

The materials of the cartridges described above may be provided with a barrier coating to improve their resistance to oxygen and/or moisture and/or other contaminant ingress. The barrier coating may also improve the resistance to leakage of the beverage ingredients from within the cartridges and/or reduce the degree of leaching of extractibles from the cartridge materials which might adversely affect the beverage ingredients. The barrier coating may be of a material selected from the group of PET, Polyamide, EVOH, PVDC or a metallised material. The barrier coating may be applied by a number of mechanisms including but not limited to vapour deposition, vacuum deposition, plasma coating, co-extrusion, in-mould labelling and two/multi-stage moulding.

The invention claimed is:

1. A cartridge containing one or more beverage ingredients and being formed from substantially air- and water-impermeable materials, the cartridge comprising an inlet for the introduction of an aqueous medium into the cartridge and an outlet for discharge of a beverage produced from the one or more beverage ingredients, wherein the cartridge comprises an outer member and an inner member conjoined on assembly with the outer member, characterised by the inner member comprising a discharge spout defining the outlet of the cartridge wherein the outer member comprises an inwardly directed extension which is received in a proximal end of the discharge spout on conjoining of the outer member and the inner member.

2. A cartridge as claimed in claim 1 wherein the inner member comprises a frame having a filter disposed thereupon.

3. A cartridge as claimed in claim 2 wherein one or more passages are defined between the frame and a closed first end of the outer member when the inner member and outer member are conjoined.

4. A cartridge as claimed in claim 3 wherein the one or more passages are delimited by webs extending upwardly from the frame to the closed first end of the outer member.

5. A cartridge as claimed in claim 4 wherein the one or more passages slope downwardly towards the discharge spout.

6. A cartridge as claimed in claim 1 wherein the inner member further comprises a skirt surrounding the discharge spout.

7. A cartridge as claimed in claim 6 wherein the skirt comprises an upper extension which, on assembly of the cartridge, contacts the closed first end of the cartridge.

8. A cartridge as claimed in claim 7 wherein an upper rim of the upper extension engages a co-operating formation of the outer member to form a snap-fit arrangement for conjoining the inner member to the outer member.

9. A cartridge as claimed in claim 8 wherein the co-operating formation of the outer member is an inwardly directed extension.

10. A cartridge as claimed in claim 9 wherein the cartridge is disc-shaped.

11. A cartridge as claimed in claim 10 further comprising means for producing a jet of the beverage, which means comprises an aperture in a beverage flow path between the inlet and the outlet.

12. A cartridge as claimed in claim 11 wherein the inlet and/or outlet is covered by a substantially air- and water-impermeable material prior to the formation, in use, of the inlet and/or outlet in the cartridge.

13. A cartridge as claimed in claim 12 wherein the inlet and/or outlet is covered by a substantially air- and water-impermeable laminate.

14. A cartridge as claimed in claim 13 wherein the laminate is polypropylene.

15. A cartridge as claimed in claim 14 wherein the outer member and/or inner member are formed from polypropylene.

16. A cartridge as claimed in claim 15 wherein the outer member and/or inner member are formed from a biodegradable polymer.

17. A cartridge as claimed in claim 16 wherein the outer member and/or inner member is formed by injection moulding.

18. A cartridge as claimed in claim 17 wherein the inner member forms a load-bearing member.

19. A cartridge as claimed in claim 18 wherein the discharge spout comprises a constriction.

20. A plurality of cartridges as claimed in claim 19 wherein the percentage yield of the beverage produced from the one or more beverage ingredients contained in the cartridges is consistent to within 1.0 standard deviations.

* * * * *